(12) United States Patent
Kabasawa et al.

(10) Patent No.: US 7,687,178 B2
(45) Date of Patent: Mar. 30, 2010

(54) FUEL CONTAINER

(75) Inventors: Yasunari Kabasawa, Hanno (JP); Yoshihisa Suda, Maebashi (JP); Kozi Nishimura, Takasaki (JP); Takahiro Osada, Sawa-gun (JP); Toshimi Kamitani, Fujioka (JP)

(73) Assignees: Casio Computer Co., Ltd., Tokyo (JP); Mitsubishi Pencil Co., Ltd., Tokyo (JP)

( * ) Notice: Subject to any disclaimer, the term of this patent is extended or adjusted under 35 U.S.C. 154(b) by 1188 days.

(21) Appl. No.: 11/262,533

(22) Filed: Oct. 28, 2005

(65) Prior Publication Data

US 2006/0093876 A1 May 4, 2006

(30) Foreign Application Priority Data

Nov. 1, 2004 (JP) ............................. 2004-318219
Nov. 19, 2004 (JP) ............................. 2004-336051
Nov. 26, 2004 (JP) ............................. 2004-341775

(51) Int. Cl.
*H01M 2/00* (2006.01)
(52) U.S. Cl. ...................... 429/34; 429/122; 220/4.12; 220/565
(58) Field of Classification Search ................ 220/565, 220/4.12; 429/12, 34, 122
See application file for complete search history.

(56) References Cited

U.S. PATENT DOCUMENTS

| | | | |
|---|---|---|---|
| 6,447,945 B1 * | 9/2002 | Streckert et al. .............. | 429/34 |
| 6,537,691 B1 | 3/2003 | Poschmann et al. | |
| 6,691,702 B2 * | 2/2004 | Appel et al. ............ | 128/202.26 |
| 6,808,833 B2 * | 10/2004 | Johnson ........................ | 429/19 |
| 6,924,054 B2 * | 8/2005 | Prasad et al. ................... | 429/34 |
| 7,004,207 B2 * | 2/2006 | Finkelshtain et al. ........... | 141/2 |
| 7,255,243 B2 * | 8/2007 | Yagisawa ..................... | 220/565 |
| 7,432,003 B2 * | 10/2008 | Miyazaki et al. ............... | 429/17 |
| 7,489,859 B2 * | 2/2009 | deVos et al. .................. | 392/441 |
| 2003/0082427 A1 * | 5/2003 | Prasad et al. ................... | 429/34 |
| 2003/0136453 A1 * | 7/2003 | Johnson ........................ | 138/30 |
| 2004/0096721 A1 * | 5/2004 | Ohlsen et al. .................. | 429/34 |
| 2004/0115506 A1 * | 6/2004 | Miyazaki et al. ............... | 429/34 |
| 2004/0173615 A1 | 9/2004 | Goodman | |
| 2005/0130009 A1 * | 6/2005 | Hasegawa et al. .............. | 429/34 |

FOREIGN PATENT DOCUMENTS

EP          1 331 684 A2    7/2003
JP          2001-93551 A    4/2001

OTHER PUBLICATIONS

Taiwanese Office Action (and English translation thereof) dated Apr. 3, 2008, issued in a counterpart Taiwanese Application.

* cited by examiner

*Primary Examiner*—Anthony Stashick
*Assistant Examiner*—Christopher B McKinley
(74) *Attorney, Agent, or Firm*—Frishauf, Holtz, Goodman & Chick, P.C.

(57) ABSTRACT

A liquid fuel is contained in a fuel container, and the liquid fuel is discharged from a fuel outlet. Further, a water is contained in a water containing pipe provided in the fuel container, and the water is discharged from a water outlet to the outside. Air taken into the fuel container through a dustproof filter attached to a rear lid portion of the fuel container is discharged to the outside from an oxygen source outlet through an oxygen source pipe. The fuel outlet, oxygen source outlet and water outlet are provided in a front outer surface of the front lid portion.

12 Claims, 23 Drawing Sheets

FUEL CONTAINER

CROSS-REFERENCE TO RELATED APPLICATIONS

This application is based upon and claims the benefit of priority from prior Japanese Patent Applications No. 2004-318219, filed Nov. 1, 2004; No. 2004-336051, filed Nov. 19, 2004; and No. 2004-341775, filed Nov. 26, 2004, the entire contents of all of which are incorporated herein by reference.

BACKGROUND OF THE INVENTION

1. Field of the Invention

The present invention relates to a fuel container containing a fluid.

2. Description of the Related Art

Recently, remarkable progress and development have been achieved in small-sized electronic devices such as mobile telephones, notebook-type personal computers, digital cameras, wristwatches, personal digital assistances (PDAs) and electronic diaries. As a power source of each electronic device, there is used a primary battery such as an alkaline dry battery or a manganese dry battery, or a secondary battery such as a nickel-cadmium storage battery, a nickel-hydrogen storage battery or a lithium-ion battery. However, if verified in respect of effective use of energy, the primary battery and the secondary battery do not necessarily effectively utilize the energy. Thus, nowadays, research and development are actively conduced on a fuel battery capable of energy use with high efficiency to replace the primary battery and the secondary battery.

A fuel battery described in Jpn. Pat. Appln. KOKAI Publication No. 2001-93551 comprises a fuel battery main body in which an electrolytic plate is sandwiched between a fuel electrode and an oxidant electrode, and a fuel container which contains a mixture of a liquid fuel such as methanol and water and which is connected to the fuel battery main body. If the fuel container becomes empty, it can be replaced with a new fuel container.

In such a container which contains the liquid fuel for the fuel battery, one outlet is formed, from which the mixed solution of the liquid fuel and water is supplied. However, when it is desired to separately supply the liquid fuel and water, water and the liquid fuel need to be separately contained. In that case, two containers need to be prepared for the liquid fuel and water. Alternatively, a space in one container needs to be divided into two spaces, so that water is contained in one space while the liquid fuel is contained in the other space. In both cases, a water outlet and a liquid fuel outlet have to be separately connected to the fuel battery main body when the container is attached to the fuel battery main body, and an operation for this may be troublesome. Further, since oxygen is required in addition to the liquid fuel to generate electric energy, an oxygen supply path is needed.

In an unused fuel container, it is preferable to seal the outlet from which the liquid fuel is discharged, in order to maintain a state of preservation and to prevent outside air from flowing into the fuel container and prevent the liquid fuel in the fuel container from flowing out from the outlet. At this time, it is required to efficiently expose the outlet from the fuel container in use.

When such a fuel container is installed in the electronic device, the fuel container is preferably small, and in particular when a plurality of fluids discharged from a plurality of outlets is contained in the fuel container, a volume ratio of the plurality of fluids to a volume of the fuel container is preferably higher.

BRIEF SUMMARY OF THE INVENTION

A fuel container according to a first aspect of the present invention comprises:

a main body including a fuel containing section to contain a fuel and a water containing section to contain water;

a fuel outlet disposed in an end face of the main body to discharge the fuel contained in the fuel containing section; and a water outlet disposed in the end face to discharge water contained in the water containing section.

The fuel containing section preferably has a follower on a tip side of the filled fuel.

The water containing section preferably has a water containing pipe disposed in the fuel containing section to contain water therein.

The water containing pipe preferably has a follower on a tip side of the filled water.

Preferably, the main body further comprises an oxygen source connecting portion which connects an oxygen source from the outside, and an oxygen source outlet disposed in the end face to discharge the oxygen source via the oxygen source connecting portion.

The main body is preferably provided with an oxygen source introduction port to introduce the oxygen source from the outside in an end face different from the above end face.

The oxygen source introduction port is preferably provided with a dustproof filter.

The oxygen source connecting portion preferably has an oxygen source pipe disposed in the fuel containing section to connect the oxygen source to the inside thereof.

A fuel container according to a second aspect of the present invention comprises:

a main body including a fuel containing section to contain a fuel and an oxygen source connecting portion to connect an oxygen source from the outside;

a fuel outlet disposed in an end face of the main body to discharge the fuel contained in the fuel containing section; and an oxygen source outlet disposed in the end face to discharge the oxygen source via the oxygen source connecting portion.

The fuel containing section preferably has a follower on a tip side of the filled fuel.

The oxygen source connecting portion preferably has an oxygen source pipe disposed in the fuel containing section to connect the oxygen source to the inside thereof.

The main body is preferably provided with an oxygen source introduction port to introduce the oxygen source from the outside in an end face different from the above end face.

The oxygen source introduction port is preferably provided with a dustproof filter.

Preferably, the main body further comprises a water containing section to contain water, and a water outlet disposed in the end face to discharge water contained in the water containing section.

The water containing section preferably has a water containing pipe disposed in the fuel containing section to contain water therein.

The water containing pipe preferably has a follower on a tip side of the filled water.

A fuel container according to a third aspect of the present invention comprises:

a container main body containing a liquid fuel in which a port connecting the inside and the outside thereof is formed in an end face;

a packing material having a trunk winding portion wound around a trunk of the container main body; and an edge portion separable from the trunk winding portion and sealing the end face of the container main body.

The port preferably has a fuel outlet to discharge the liquid fuel contained in the container main body.

The port preferably has a water outlet to discharge water contained in the container main body.

The port preferably has an oxygen source outlet to discharge air.

The port preferably has an air introduction port to introduce air.

The air introduction port is preferably closed by a dust-proof filter.

Preferably, the fuel outlet to discharge the liquid fuel in the container main body is formed as the port in one end face of the container main body, and the air introduction port to introduce air is formed as the port in the other end face of the container main body; and a first edge portion of the edge portion covers the fuel outlet, and a second edge portion of the edge portion covers the air introduction port.

Preferably, a groove is formed in an outer side surface of the container main body, and a flow path connecting the groove to the port is formed by covering the groove with the packing material.

A fuel container according to a fourth aspect of the present invention comprises:

a container main body having a groove formed in the outside thereof and a wall separating a liquid fuel in the inside thereof; and a packing material covering the groove of the container main body.

A thickness of the packing material is preferably smaller than that of the wall of the container main body.

Preferably, an opening is formed in the container main body, and the fuel container further has a lid portion which closes the opening of the container main body and which has a flow path communicating with the groove.

The lid portion preferably has a communication port communicating with the groove.

Preferably, the packing material has a lid covering portion to cover the lid portion, and a cutoff line to cut off the lid covering portion.

The groove preferably satisfies $W1 > \{S1/(2 \times \pi)\}^{1/2}$, wherein S1 is a cross sectional area of the groove, and W1 is a width of the groove.

According to the present invention, the fuel container can be efficiently coupled to another device.

DETAILED DESCRIPTION OF THE INVENTION

First Embodiment

An embodiment of the present invention will hereinafter be described with reference to the drawings. However, while technically preferable various limitations are imposed on the embodiment described below to implement the present invention, the scope of the invention is not limited to the following embodiment and illustrated examples.

Figure 1:
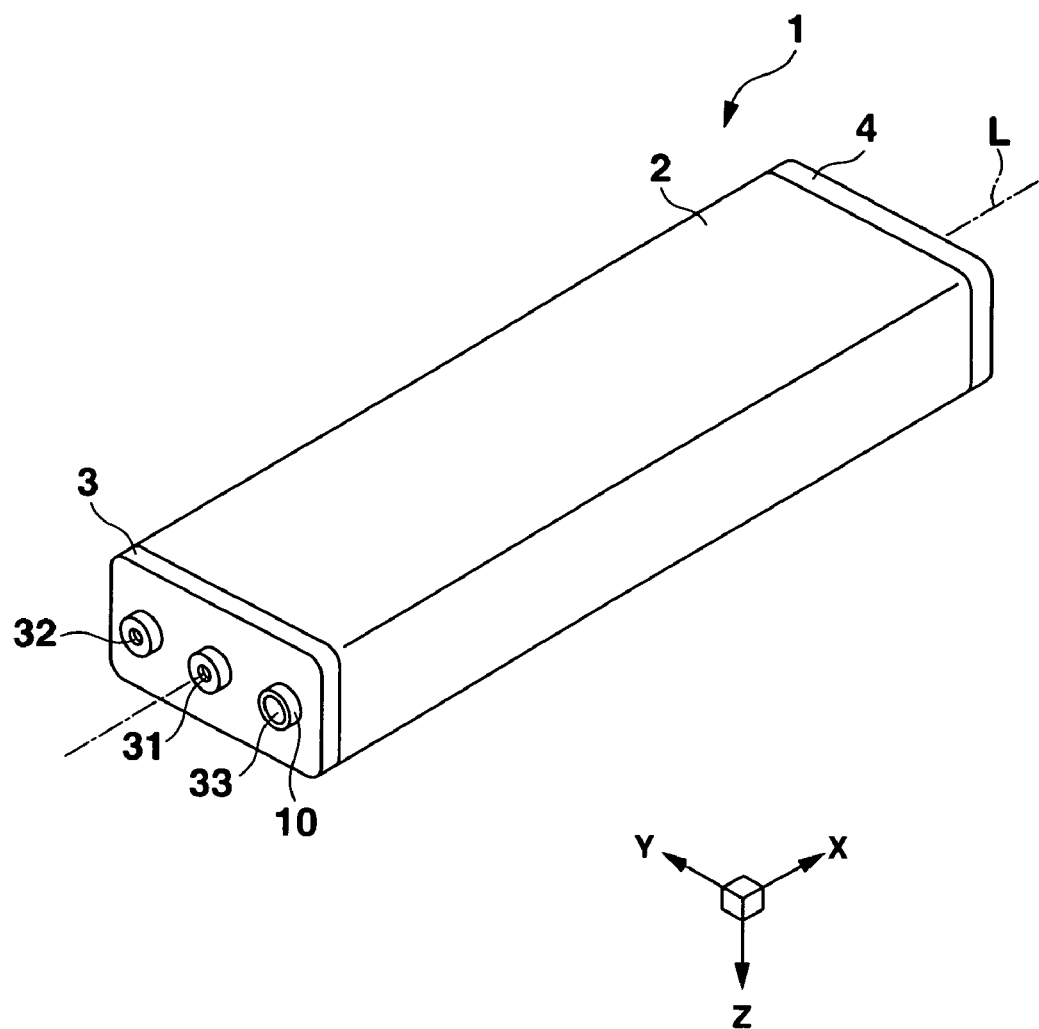
FIG. 1 is a perspective view of a fuel container according to a first embodiment of the present invention.
Figure 2:
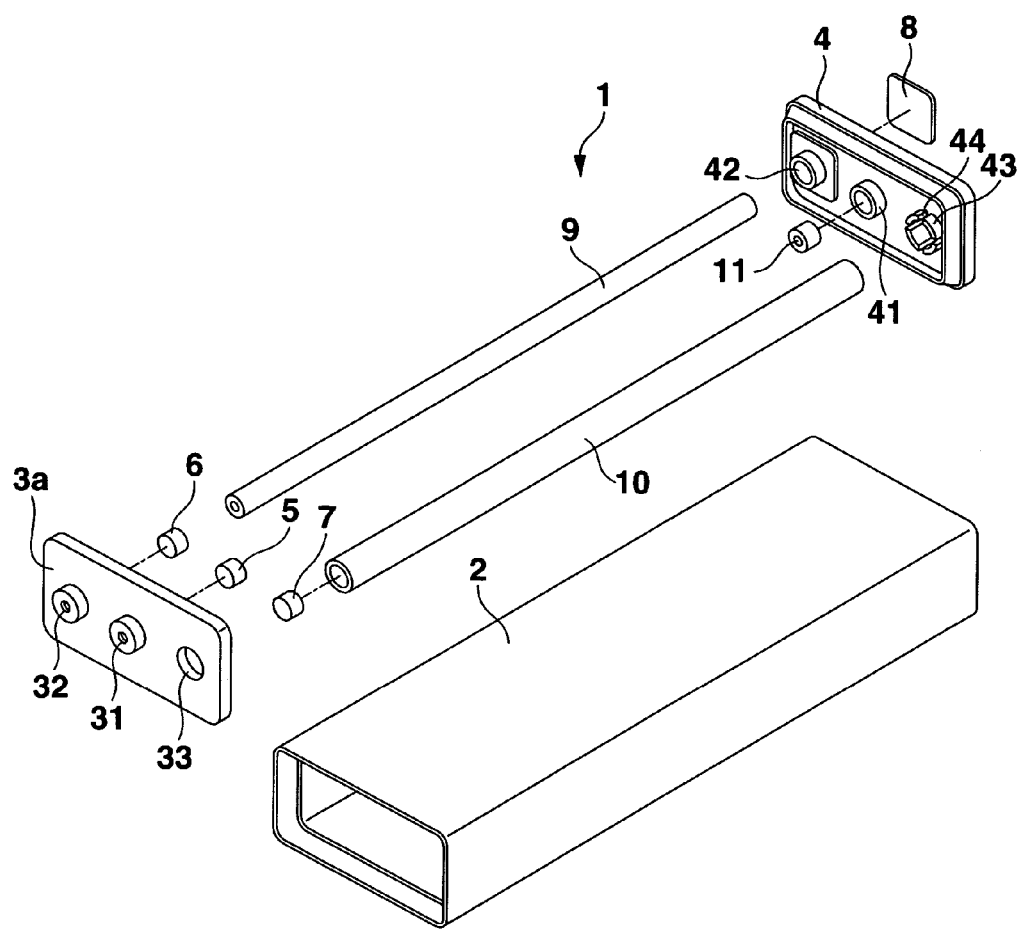
FIG. 2 is an exploded perspective view of the fuel container.
Figure 3:
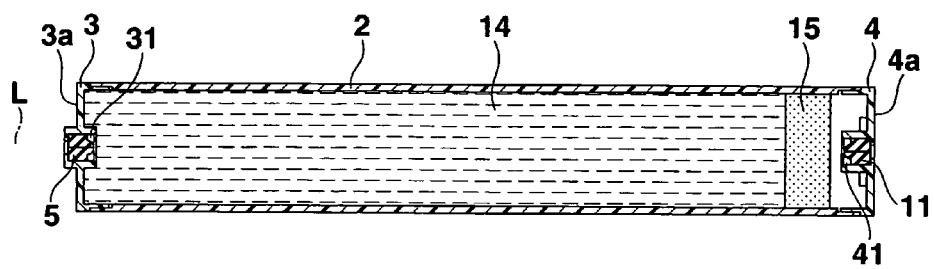
FIG. 3 is a longitudinal sectional view cut along a center line of the fuel container.
Figure 4:
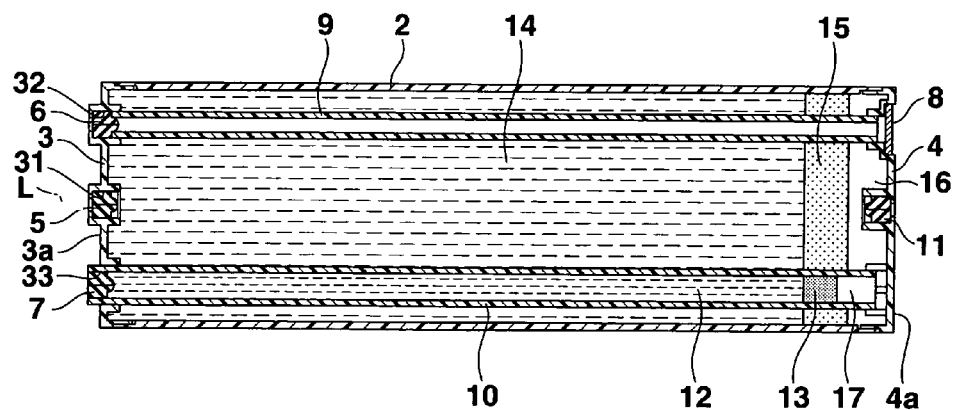
FIG. 4 is a transverse sectional view cut along the center line of the fuel container.

FIG. 1 is a perspective view of a fuel container 1 in a first embodiment to which the present invention is applied. FIG. 2 is an exploded perspective view of the fuel container 1. FIG. 3 is a sectional view showing a cut surface passing a center line L which extends along a longitudinal direction X of the fuel container 1 and being in parallel with a thickness direction Z of the fuel container 1 in such a manner as to direct the cut surface in a width direction Y of the fuel container 1. FIG. 4 is a transverse sectional view showing a cut surface passing the center line L which extends along the longitudinal direction X of the fuel container 1 and being in parallel with the width direction Y of the fuel container 1 in such a manner as to direct the cut surface in the thickness direction Z of the fuel container 1.

As shown in FIGS. 1 to 4, the fuel container 1 has a container main body 2 substantially in a tubular shape such as rectangular parallelepiped shape, and various members are attached to the container main body 2. The container main body 2 is a rectangular pipe whose inside is hollow, and a front end and a rear end of the main body 2 are open, and in this embodiment, the container main body 2 is formed in a rectangular frame shape when viewed in the longitudinal direction X.

An oxygen source pipe 9 and a water containing pipe 10 are provided in the container main body 2. The oxygen source pipe 9 and the water containing pipe 10 extend in the longitudinal direction X or the center axis L of the container main body 2.

A front lid portion 3 is fitted into an opening on a front end side of the container main body 2, and thus the opening on the front end side of the container main body 2 is closed by the front lid portion 3. A rear lid portion 4 is fitted into an opening on a rear end side of the container main body 2, and thus the opening on the rear end side of the container main body 2 is closed by the rear lid portion 4. In the container main body 2, there is formed a space 16 defined by a rear portion of the container main body 2 and the lid portion 4.

A fuel outlet 31, an oxygen source outlet 32 and a water outlet 33 are perforated through the front lid portion 3 and exposed on in a front outer surface 3a thereof. The fuel outlet 31 is formed in a central portion of the front lid portion 3, and the water outlet 33, the fuel outlet 31 and the oxygen source outlet 32 are linearly arranged in this order along the width direction Y of the fuel container 1.

The fuel outlet 31 and the oxygen source outlet 32 penetrate from a rear inner surface to the front outer surface 3a of the front lid portion 3, and circumferences of tip portions of the fuel outlet 31 and the oxygen source outlet 32 are convexly provided in a nipple shape on the outer surface 3a of the front lid portion 3. The water outlet 33 also penetrates from the inner surface to the outer surface 3a of the front lid portion 3, but a circumference of a tip portion of the water outlet 33 is provided to be flat with the outer surface 3a, that is, a tip surface thereof is provided to be the same surface as the outer surface 3a.

A check valve 5 is fitted in the fuel outlet 31 to block flow of a fluid unnecessarily passing from the inside to the outside of the container main body 2 through the fuel outlet 31. Specifically, the check valve 5 is preferably a duck bill valve in which a flexible and elastic material (e.g., an elastomer) is formed in a duck bill shape, and the check valve 5 is fitted into the fuel outlet 31 in a state where its duck-bill-shaped tip is directed to the inside of the container main body 2. The check valve 5 may be provided in advance with an insertion hole which connects the inside and outside of the container main body 2 when a fuel introduction pipe 64 (shown in FIG. 6) described later is inserted, or the check valve 5 may have a structure such that the insertion hole is not formed until the fuel introduction pipe 64 is inserted. When the insertion hole is provided in advance, force is applied around the insertion hole in a direction to close the insertion hole if pressure is applied to the inside of the container main body 2, so that the fluid does not unnecessarily leak from the insertion hole to the outside of the container main body 2.

A check valve 6 is fitted in the oxygen source outlet 32 to block flow of a fluid unnecessarily passing from the inside to the outside of the container main body 2 through the oxygen source outlet 32. Specifically, the check valve 6 may be a duck bill valve in which a flexible and elastic material (e.g., an elastomer) is formed in a duck bill shape, and the check valve 6 is fitted into the oxygen source outlet 32 in a state where its duck-bill-shaped tip is directed to the inside of the container main body 2. The check valve 6 may be provided in advance with an insertion hole which connects the inside and outside of the container main body 2 when an air introduction pipe 65 (shown in FIG. 6) described later is inserted, or the check valve 5 may have a structure such that the insertion hole is not formed until the air introduction pipe 65 is inserted. When the insertion hole is provided in advance, force is applied around the insertion hole in a direction to close the insertion hole if pressure is applied to the inside of the container main body 2, so that the fluid does not unnecessarily leak from the insertion hole to the outside of the container main body 2.

A first air introduction port 41 and a second air introduction port 42 are perforated in the rear lid portion 4. The first air introduction port 41 is formed at a position corresponding to the fuel outlet 31, and the second air introduction port 42 is formed at a position corresponding to the oxygen source outlet 32.

Figure 5:
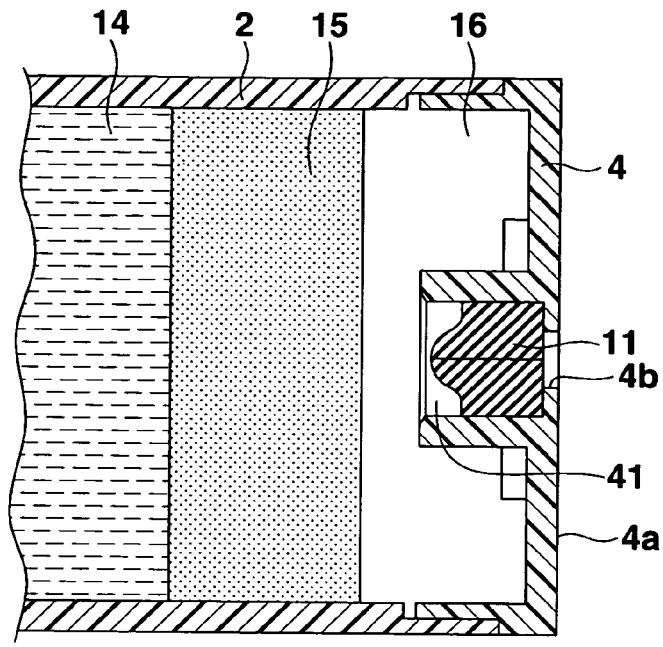
FIG. 5 is a sectional view in which a rear lid portion of the fuel container is enlarged.

The first air introduction port 41 penetrates from an inner surface to an outer surface 4a of the rear lid portion 4. As shown in FIGS. 3, 5, a check valve 11 is fitted into the first air introduction port 41 to block flow of a fluid passing from the inside to the outside of the main body 2 through the first air introduction port 41. Specifically, the check valve 11 is, for example, a duck bill valve in which a flexible and elastic material (e.g., an elastomer) is formed in a duck bill shape, and the check valve 11 is fitted into the first air introduction port 41 in a state where its duck-bill-shaped tip is directed to the inside of the main body 2. It is to be noted that FIG. 5 is a sectional view showing the rear lid portion 4 side in the same cut surface as that of FIG. 3 in an enlarged form. The check valve 11 is provided in advance with an insertion hole which connects the inside and outside of the main body 2, and this insertion hole is provided in the rear lid portion 4 and communicates with an exhaust vent 4b opening in a thickness direction. In the check valve 11, force is applied around the insertion hole in a direction to close the insertion hole if pressure is applied to the inside of the main body 2, so that the fluid does not unnecessarily leak from the insertion hole to the outside of the main body 2. Inversely, it is set in such a manner that air from the outside of the main body 2 moves in via the insertion hole to buffer a pressure difference between the inside and outside of the main body 2 in accordance with negative pressure caused by a reduction, inside the main body 2, in an amount of a later-described liquid fuel 14 stored in the main body 2.

As shown in FIGS. 2, 4, the second air introduction port 42 penetrates from the inner surface to the outer surface of the rear lid portion 4, and a circumference of the second air introduction port 42 is concavely provided in the outer surface of the rear lid portion 4. A dustproof filter 8 is fitted in the concavely provided portion, and the dustproof filter 8 allows the air from the outside of the main body 2 to enter the oxygen source pipe 9, and closes the second air introduction port 42 so that dusts from the outside of the container main body 2 do not enter the oxygen source pipe 9.

One end of the oxygen source pipe 9 is inserted into the second air introduction port 42. The other end of the oxygen source pipe 9 is inserted into the oxygen source outlet 32, and the oxygen source pipe 9 is built between the front lid portion 3 and the rear lid portion 4. As described above, the dustproof filter 8 is located ahead of the one end of the oxygen source pipe 9, and the check valve 6 is located ahead of the other end of the oxygen source pipe 9.

As shown in FIGS. 1, 2, 4, the water containing pipe 10 is inserted into the water outlet 33 of the front lid portion 3 to penetrate therethrough, and one end of the water containing pipe 10 protrudes outward from the outer surface of the front lid portion 3. On the other hand, a grasp portion 43 (FIG. 2) is formed in the inner surface of the rear lid portion 4 at a position corresponding to the water outlet 33, and attached so that the other end of the water containing pipe 10 is grasped by the grasp portion 43. Thus, the water containing pipe 10 is built between the front lid portion 3 and the rear lid portion 4. It is to be noted that a plurality of, for example, four gaps 44 are provided in the grasp portion 43 provided in the inner surface of the rear lid portion 4 at a position where the other end of the water containing pipe 10 is fitted, and a space 17 on the other end face side of the water containing pipe 10 communicates with the space 16 via the gaps 44, so that an opening at the other end of the water containing pipe 10 is not closed.

As shown in FIGS. 2, 4, a check valve 7 is fitted in the water containing pipe 10 at the end on the water outlet 33 side to block flow of the fluid running from the inside of the water containing pipe 10 to its end opening. The check valve 7 may be a duck bill valve in which a flexible and elastic material (e.g., an elastomer) is formed in a duck bill shape, and the check valve 7 is fitted in the water containing pipe 10 in a state where its duck-bill-shaped tip is directed toward the rear lid portion 4. The check valve 7 may be provided in advance with an insertion hole which connects the inside and outside of the main body 2 when a water introduction pipe 66 (shown in FIG. 6) described later is inserted, or the check valve 7 may have a structure such that the insertion hole is not formed until the water introduction pipe 66 is inserted. When the insertion hole is provided in advance, force is applied around the insertion hole in a direction to close the insertion hole if pressure is applied to the inside of the main body 2, so that the fluid does not unnecessarily leak from the insertion hole to the outside of the main body 2.

As shown in FIG. 4, a viscous follower 13 is contained in the water containing pipe 10. An entire outer periphery of the follower 13 contacts the inner wall of the water containing pipe 10, and a space in the water containing pipe 10 is divided into an area on the front lid portion 3 side and an area on the rear lid portion 4 side by the follower 13. Further, a water 12 is stored in the water containing pipe 10. The water 12 is completely filled in the area on the front lid portion 3 side of the two areas separated by the follower 13, and the follower 13 is located closer to the rear lid portion 4 side than the water body. In addition, the water 12 and the follower 13 are in contact. The follower 13 is a liquid with a low affinity for the water 12 such as sol or gel, and is still desirably a highly viscous liquid having viscosity higher than that of the water 12 and being insoluble in the water 12. Further, the follower 13 preferably has a property of a structurally viscous fluid (anomalously viscous fluid) which reduces apparent stress when shear stress (or shear rate) increases. Specifically, polybutene, liquid paraffin, spindle oil, other mineral oils, dim- ethyl silicon oil, methyl phenyl silicon oil, other silicon oils, and a combination of these can be used as the follower 13. It is to be noted that since the check valve 7 is provided in the water containing pipe 10, the water 12 in the water containing pipe 10 does not leak out by itself.

In this way, there is only a small amount of a gas between the water 12 and the follower 13 which expands if pressure is reduced, so that if the water 12 in the water containing pipe 10 is discharged toward a power generation unit 91 having a fuel battery from the water outlet 33 as described later, the water 12 between the check valve 7 and the follower 13 flows to the check valve 7 side. Thus, an end of the water body moves to the check valve 7 side and then the follower 13 is drawn thereto. The follower 13 has a desired fluidity to be drawn while maintaining close contact with the inner wall of the water containing pipe 10 so that the water 12 does not leak into the space 17.

As shown in FIGS. 3, 4, 5, a viscous follower 15 is contained in the main body 2. An entire outer periphery of the follower 15 contacts the inner wall of the main body 2, and a space in the main body 2 is divided into an area on the front lid portion 3 side and an area on the rear lid portion 4 side by the follower 15. Further, the liquid fuel 14 is stored in the main body 2. The liquid fuel 14 is filled in the area on the front lid portion 3 side of the two areas separated by the follower 15, and the follower 15 is located closer to the rear lid portion 4 side than the liquid fuel 14. In addition, the liquid fuel 14 and the follower 15 are in contact. The follower 15 is a liquid with a low affinity for the liquid fuel 14 such as sol or gel, and is still desirably a highly viscous liquid having viscosity higher than that of the liquid fuel 14 and being insoluble in the liquid fuel 14. Further, the follower 15 preferably has a property of the structurally viscous fluid (anomalously viscous fluid) which reduces apparent stress when shear stress (or shear rate) increases. Specifically, polybutene, liquid paraffin, spindle oil, other mineral oils, dimethyl silicone oil, methyl phenyl silicone oil, other silicone oils, and a combination of these can be used as the follower 15. It is to be noted that since the check valve 5 is provided in the fuel outlet 31, the liquid fuel 14 in the container main body 2 does not leak out by itself.

In this way, there is only a small amount of a gas between the liquid fuel body and the follower 15 which expands if pressure is reduced. Thus, if the liquid fuel 14 in the main body 2 is discharged toward the power generation unit 91 from the fuel outlet 31 as described later, the liquid fuel 14 between the check valve 5 and the follower 15 flows to the check valve 5 side, with the result that an end of the liquid fuel body moves to the check valve 5 side and thus the follower 15 is drawn thereto. The follower 15 has a desired fluidity to be drawn while maintaining close contact with the inner wall of the container main body 2 so that the liquid fuel 14 does not leak into the space 16.

When the fuel container 1 is packed and shipped, other members can be collectively covered without gas permeation, thus leading to good productivity.

This fuel container 1 is attached to a device which uses the liquid fuel 14 (hereinafter referred to as a fuel consumption device.) to supply the fuel consumption device with the liquid fuel 14 and the water 12. When the liquid fuel 14 in the fuel container 1 has run out, the fuel container 1 is detached from the fuel consumption device, and a new fuel container 1 is attached to the fuel consumption device. The fuel consumption device to which the fuel container 1 is attached will be explained below.

Figure 6:
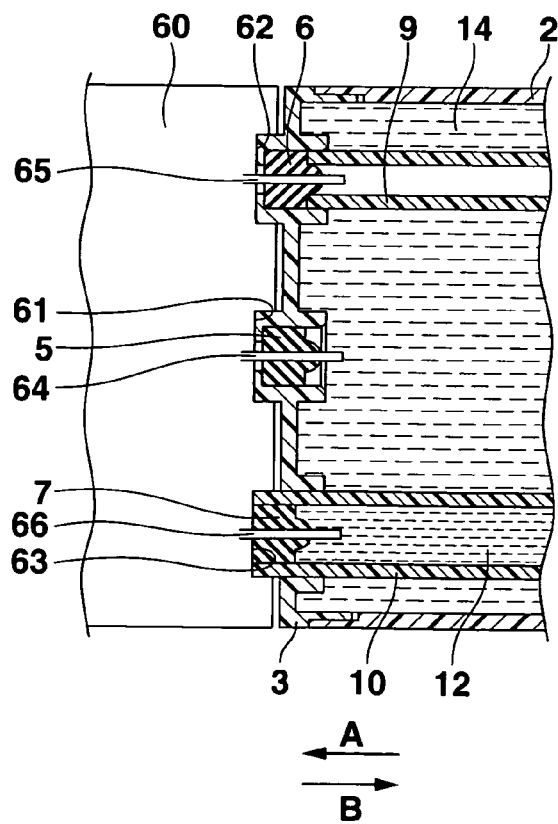
FIG. 6 is a diagram schematically showing a connection structure between the fuel container and a fuel consumption device.

FIG. 6 is a schematic diagram showing a attachment structure of a fuel consumption device 60 and the fuel container 1.

The fuel consumption device 60 is concavely provided with three attachment slots or recesses 61, 62, 63. The first attachment slot 61 is formed at a position facing the fuel outlet 31, the second attachment slot 62 is formed at a position facing the oxygen source outlet 32, and the third attachment slot 63 is formed at a position facing the end of the water containing pipe 10. The fuel introduction pipe 64 is attached to the first slot 61, and the fuel introduction pipe 64 protrudes from the attachment slot 61. In the same manner, the air introduction pipe 65 is attached to the second slot 62, and the water introduction pipe 66 is attached to the third slot 63.

By simply moving the fuel container 1 in a direction of an arrow A in such a manner as to direct the outer surface 3a of the front lid portion 3 of the fuel container 1 to the fuel consumption device 60, a nipple portion around the fuel outlet 31 is fitted into the first slot 61, a nipple portion around the oxygen source outlet 32 is fitted into the second slot 62, and the water outlet 33 at the end of the water containing pipe 10 is fitted into the third slot 63, thereby enabling the fuel container 1 to be firmly attached to the fuel consumption device 60. In this way, the fuel introduction pipe 64 is inserted into the fuel outlet 31, and further inserted into the check valve 5, so that the check valve 5 is opened by the fuel introduction pipe 64. In the same manner, the air introduction pipe 65 is inserted into the check valve 6, and the water introduction pipe 66 is inserted into the check valve 7. Thus, the liquid fuel 14 in the container main body 2 is supplied to the fuel consumption device 60 through the fuel introduction pipe 64, and the water 12 in the water containing pipe 10 is supplied to the fuel consumption device 60 through the water introduction pipe 66. Moreover, outside air is sucked into the oxygen source pipe 9 through the dustproof filter 8, and passes through the air introduction pipe 65 from the oxygen source pipe 9 and is thus supplied to the fuel consumption device 60. When the fuel container 1 is to be detached, the fuel container 1 is simply moved in a direction of an arrow B, so that the fuel outlet 31 can be removed from the first slot 61, the oxygen source outlet 32 can be removed from the second slot 62, and the water outlet 33 can be removed from the third slot 63.

As described above, since the fuel outlet 31, the oxygen source outlet 32 and the water outlet 33 are provided on the same surface 3a (i.e., the outer surface of the front lid portion 3) of the fuel container 1, three outlets 31, 32, 33 can be simultaneously connected to the fuel consumption device 60 by simply pushing the surface 3a into a storage portion of the fuel consumption device 60 which stores the fuel container 1 of the fuel consumption device 60. Therefore, an attachment operation of the fuel container 1 can be easily performed.

If the liquid fuel 14 in the container main body 2 decreases, the shear stress is thus caused to the follower 15 to reduce a viscosity coefficient of the follower 15, and the follower 15 will follow to the front lid portion 3 side as the liquid fuel 14 is consumed. If the water 12 in the water containing pipe 10 decreases, the shear stress is thus caused to the follower 13 to reduce a viscosity coefficient of the follower 13, and the follower 13 will follow to the front lid portion 3 side as the water 12 is consumed. If both the liquid fuel 14 and the water 12 decrease, the space closer to the rear lid portion 4 side than the follower 15 is decompressed, but the check valve 11 is opened by the decompression of the space and the outside air is supplied into the space, thus keeping the space substantially at atmospheric pressure.

Figure 7:
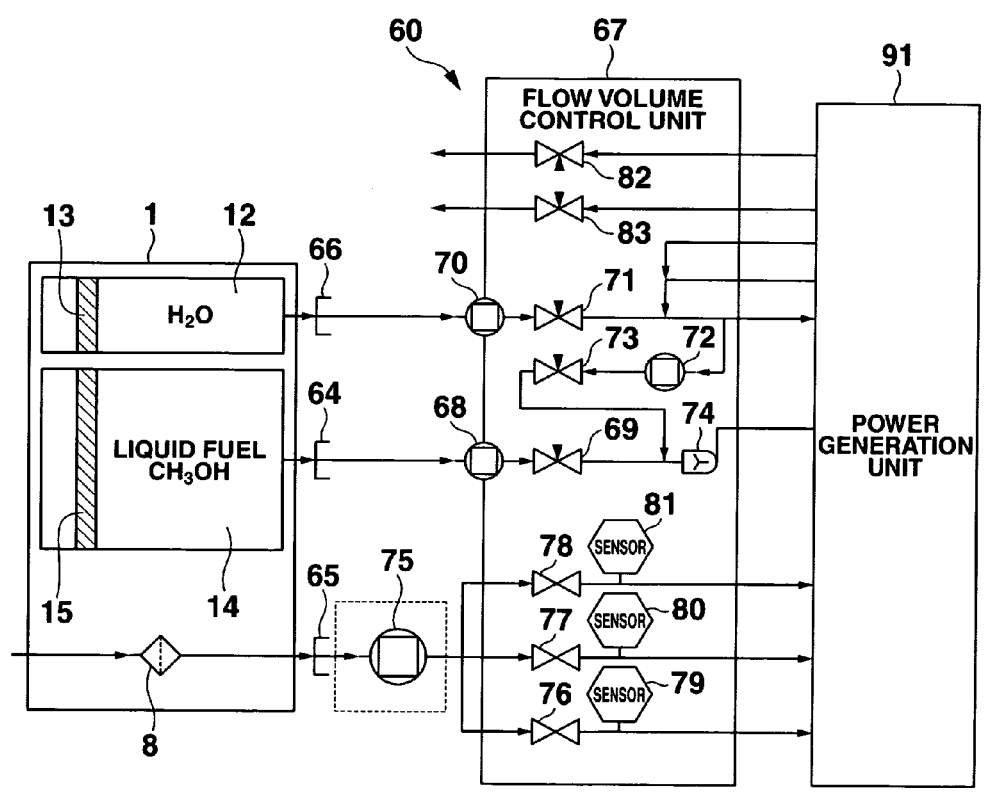
FIG. 7 is a block diagram showing a state in which a fluid control unit, a power generation unit and the fuel container are connected.

As shown in FIG. 7, there are built in the fuel consumption device 60 the power generation unit 91 which generates power using the liquid fuel 14 in the fuel container 1 and which supplies the power to a load of an external electric device or the like, and a flow volume control unit 67 which feeds the liquid fuel 14, the water 12 and air from the fuel container 1.

The flow volume control unit 67 comprises a fuel pump 68 which sucks in the liquid fuel 14 through the fuel introduction pipe 64; a valve 69 which allows/stops the flow of the liquid fuel 14 sucked in by the fuel pump 68; a water pump 70 which sucks in and sends the water 12 stored in the fuel container 1 through the water introduction pipe 66; a valve 71 which allows/stops the flow of the water 12 sent by the water pump 70; a pump 72 which sucks in the water 12 discharged from the valve 71; a valve 73 which allows/stops the flow of the water 12 sucked in by the pump 72; a mixer 74 which mixes the liquid fuel 14 sent from the valve 69 and the water 12 sent from the valve 73 to send the mixture to the power generation unit 91; an air pump 75 which sucks in air through the air introduction pipe 65; valves 76, 77, 78 which are respectively provided in three branch flow paths where the air sent from the air pump 75 flows and which control the flow; sensors 79, 80, 81 which measure flow volumes of the air flowing to the power generation unit 91 from the valves 77, 76, 78; and valves 82, 83 which allows/stops flow of a product discharged from the power generation unit 91. The water 12 flowing out of the valve 71 branches to flow both to the power generation unit 91 and to the pump 72.

Figure 8:
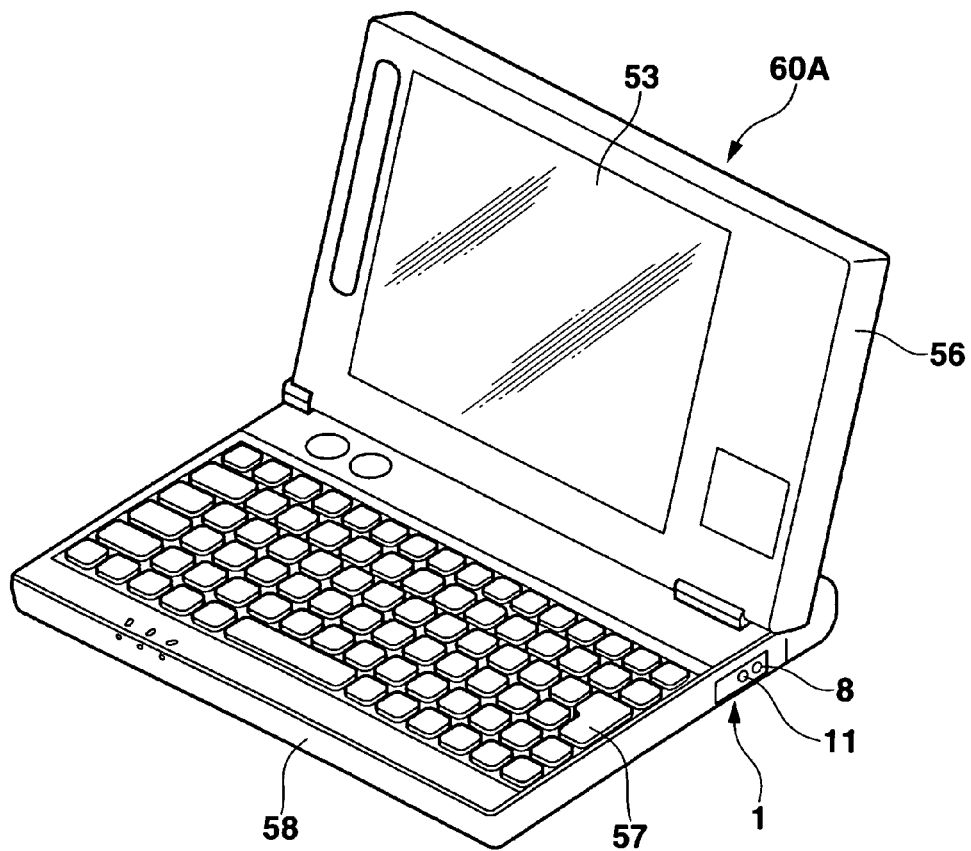
FIG. 8 is a schematic perspective view of a notebook-type personal computer as an example of the fuel consumption device.
Figure 9:
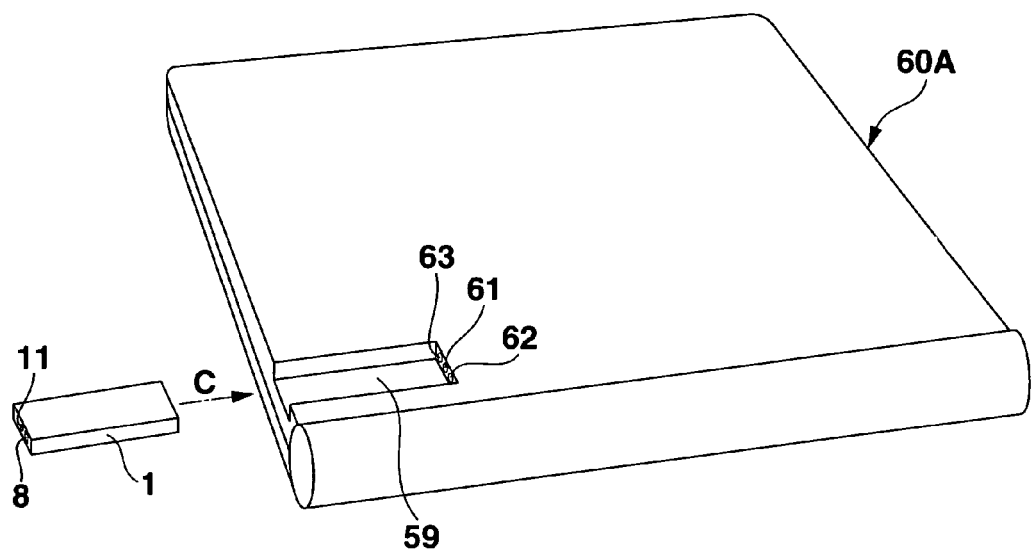
FIG. 9 is a schematic perspective view of the fuel container and the notebook-type personal computer.

FIGS. 8 and 9 show a case where a notebook-type personal computer is applied as the fuel consumption device 60. A notebook-type personal computer 60A of the present embodiment comprises a first case 56 having a display unit 53 and a second case 58 having an input unit 57. The first case 56 is coupled to the second case 58 by a hinge structure.

Furthermore, the second case 58 is provided with a storage portion 59 in which the fuel container 1 can be stored, and in the storage portion 59, the first to third attachment slots 61, 62, 63 corresponding to the fuel outlet 31, the oxygen source outlet 32 and the water outlet 33 of the fuel container 1, respectively, are exposed.

The display unit 53 includes for example, a backlight type liquid crystal display panel or an EL display panel, and performs screen display in accordance with an electric signal output from a control unit, and displays character information, images or the like.

The input unit 57 includes various kinds of buttons such as function keys, a numeric keypad and character inputting keys. If a button protruding from the exterior of the second case 58 is pressed/operated, the button elastically deforms to cause a movable contact point inside the button to contact a fixed contact point on a substrate in a removable manner, thereby outputting the electric signal.

The control unit of the notebook-type personal computer 60A includes operation means such as a central processing unit (CPU) and storage means such as a memory, and cooperates with software read in the computer to process or operate the input electric signal.

If the outer surface 3a of the front lid portion 3 of the fuel container 1 is inserted in a direction of an arrow C toward the storage portion 59 of the notebook-type personal computer 60A, the fuel outlet 31 is fitted into the first slot 61, the oxygen source outlet 32 is fitted into the second slot 62, and the water outlet 33 at the end of the water containing pipe 10 is fitted into third slot 63. At the same time, the fuel introduction pipe 64 is inserted into the fuel outlet 31 to open the check valve 5, and the air introduction pipe 65 is inserted into the oxygen source outlet 32 to open the check valve 6, and moreover, the water introduction pipe 66 is inserted into the water outlet 33 to open the check valve 7.

The fuel container 1 is set so that the dustproof filter 8 is exposed from a side surface of the notebook-type personal computer 60A in a state where the fuel container 1 is stored in the notebook-type personal computer 60A, and the fuel container 1 is desirably shaped to protrude neither from the side surface of the notebook-type personal computer 60A nor downward from the notebook-type personal computer 60A.

When the fuel container 1 is to be detached, the fuel container 1 is pulled out in a direction reveres to that of the arrow C, thereby allowing the fuel container 1 to be detached.

Figure 10A:
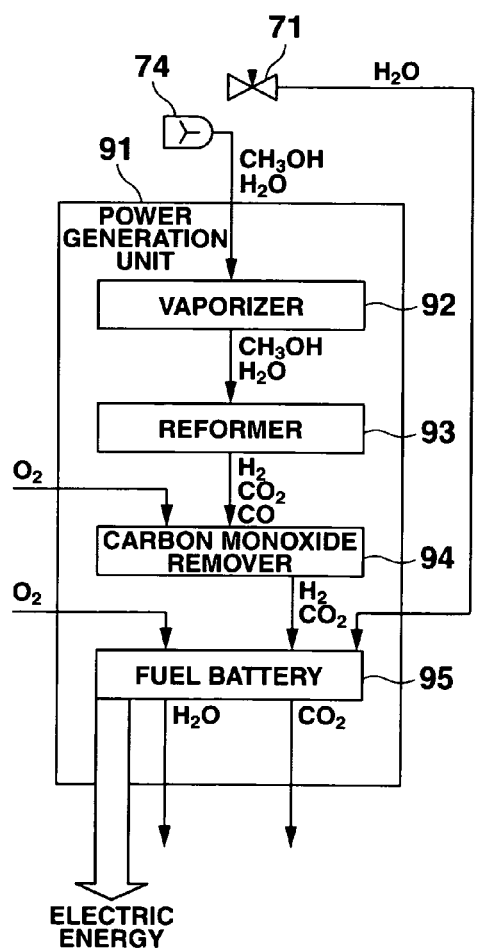
FIGS. 10A and 10B are block diagrams of different power generation units.
Figure 10B:
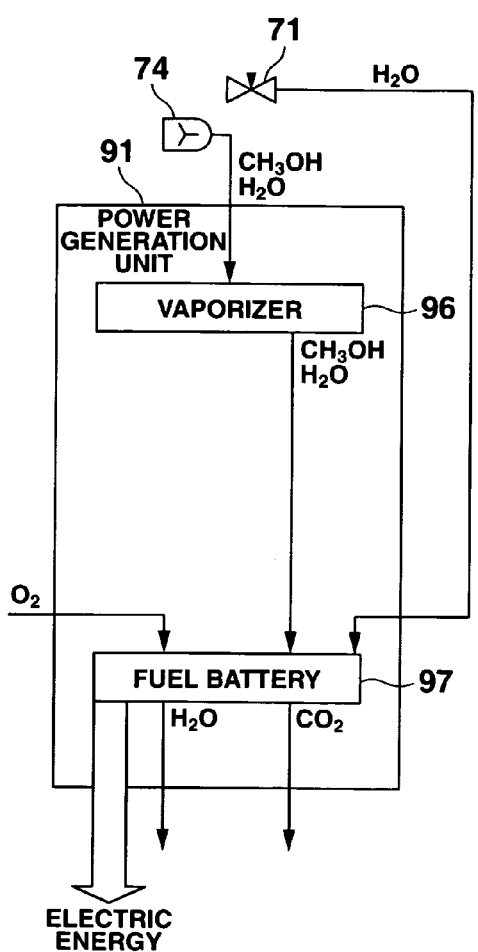

The power generation unit 91 is configured as shown in FIG. 10A or 10B. Methanol is taken as an example of the liquid fuel 14 in both cases of FIGS. 10A, 10B, but other compounds including a hydrogen element may be used, such as alcohols and gasoline.

In the case of FIG. 10A, the power generation unit 91 comprises a vaporizer 92, a reformer 93, a carbon monoxide remover 94 and a fuel battery 95.

Before the fuel battery 95 starts power generation, the fuel consumption device 60 starts the water pump 70 and the valve 71 and thus supplies the water 12 stored in the fuel container 1 to an electrolytic film of the fuel battery 95. Thus, since the electrolytic film is filled with water which hydrates hydrogen ions and ionic conductivity of the electrolytic film can thus be improved before the power generation, the electrolytic film can rapidly conduct the hydrogen ions produced from hydrogen gas when the hydrogen gas has reached the fuel battery 95.

Furthermore, when the electrolytic film of the fuel battery 95 is filled with water, the pump 72 and the valve 73 are actuated, thereby feeding, to the mixer 74, part or all of the water 12 discharged from the valve 71. Thus, the liquid fuel 14 in the fuel container 1 discharged by the fuel pump 68 and the valve 69 of the fuel consumption device 60 is fed to the mixer 74, and mixed with the water 12 in the mixer 74.

The mixture of the liquid fuel 14 and the water 12 mixed in the mixer 74 is supplied to vaporizer 92. In the vaporizer 92, the supplied mixture is heated and thus vaporized, and becomes a mixture gas of the fuel and water. The mixture gas generated in the vaporizer 92 is supplied to the reformer 93.

In the reformer 93, hydrogen and carbon dioxide are generated from the mixture gas supplied from the vaporizer 92. Specifically, carbon dioxide and hydrogen are generated by a reaction between the mixture gas and a catalyst as in Chemical Reaction Formula (1).

$$CH_3OH + H_2O \rightarrow 3H_2 + CO_2 \quad (1)$$

In the reformer 93, methanol and water vapor may not be completely reformed into carbon dioxide and hydrogen, in which case methanol reacts with water vapor to produce carbon dioxide and carbon monoxide as in Chemical Reaction Formula (2).

$$2CH_3OH + H_2O \rightarrow 5H_2 + CO + CO_2 \quad (2)$$

The mixture gas generated in the reformer 93 is supplied to the carbon monoxide remover 94.

In the carbon monoxide remover 94, carbon monoxide contained in the mixture gas supplied from the reformer 93 selectively oxidizes to remove carbon monoxide from the mixture gas. Specifically, carbon monoxide specifically selected from the mixture gas supplied from the reformer 93 reacts by the catalyst with oxygen in the air supplied from the valves 77, 76, 78, thereby generating carbon dioxide.

$$2CO + O_2 \rightarrow 2CO_2 \quad (3)$$

Then, the mixture gas is supplied from the carbon monoxide remover 94 to a fuel electrode of the fuel battery 95.

In the fuel electrode of the fuel battery 95, the hydrogen gas in the mixture gas supplied from the carbon monoxide remover 94 separates into hydrogen ions and electrons due to a catalytic action of the fuel electrode as shown in Electrochemical Reaction Formula (4). The hydrogen ions are conducted to an air electrode through an electrolytic film such as a solid polymer electrolytic film of the fuel battery 95, and the electrons are extracted by the fuel electrode. Since the electrolytic film of the fuel battery 95 is humidified in advance by the water 12 in the fuel container 1 before the hydrogen gas supplied from the carbon monoxide remover 94 reaches the fuel battery 95, the hydrogen ions produced during the power generation hydrates with water contained in an electrolyte to allow the improvement of the ionic conductivity of the electrolytic film, so that the electrolytic film can easily conduct the hydrogen ions produced from the hydrogen gas when the hydrogen gas reaches the fuel battery 95.

$$3H_2 \rightarrow 6H^+ + 6e^- \quad (4)$$

The air from the valves 77, 76, 78 is sent to the air electrode of the fuel battery 95. Then, as shown in Electrochemical Reaction Formula (5), oxygen in the air, the hydrogen ions passed through the solid polymer electrolytic film and the electrons cause a reaction to produce water as a by-product.

$$6H^+ + 3/2 O_2 + 6e^- \rightarrow 3H_2O \quad (5)$$

As described above, the electrochemical reactions indicated by (4), (5) are caused in the fuel battery 95 to generate electric energy. A mixture gas of water as the by-product, carbon dioxide, air and the like are discharged to the outside through the valves 82, 83.

The dustproof filter 8 is clogged with particles in proportion to an amount of oxygen consumed by the chemical reactions described above. As the dustproof filter 8 is clogged with particles, air suction force is reduced and reaction efficiency may be decreased in the air pump 75. However, since the dustproof filter 8 is attached to the fuel container 1, the dustproof filter 8 can be replaced together by replacing the fuel container 1. Thus, the dustproof filter 8 may only have a dust collection capacity to permeate an amount of oxygen corresponding to the amount of the liquid fuel 14 sealed in one fuel container 1, that is, the dustproof filter may not be such that the dusts in the amount of oxygen corresponding to the amount of the liquid fuel 14 sealed in a plurality of fuel containers 1 can be collected. Therefore, a size reduction can be achieved and the chemical reactions can be efficiently caused without applying excessive load onto the air pump 75. Further, the dustproof filter 8 is not clogged with particles or dusts by letting in the air necessary for the liquid fuel 14 in the plurality of fuel containers 1. Therefore, a structure of the air pump 75 does not have to be increased in size for the air suction force even if the clogging occurs, so that when the power generated by the power generation unit 91 is used as a source of power for the air pump 75, a ratio of the power supplied to the load of the external electric device or the like can be raised while ratio of the power required for the power generation of the power generation unit 91 can be dropped, out of the power generated by the power generation unit 91.

In the case of FIG. 10B, the power generation unit 91 comprises a vaporizer 96 and a fuel battery 97.

The mixture of the liquid fuel 14 and the water 12 mixed in the mixer 74 is vaporized in the vaporizer 96, and becomes a mixture gas of methanol and water vapor. The mixture gas generated in the vaporizer 96 is supplied to a fuel electrode of the fuel battery 97.

In the fuel electrode of the fuel battery 97, the mixture gas supplied from the vaporizer 96 separates into hydrogen ions, electrons and carbon dioxide due to a catalytic action of the fuel electrode as shown in Electrochemical Reaction Formula (6). The hydrogen ions are conducted to an air electrode through a solid polymer electrolytic film, and the electrons are extracted by the fuel electrode.

$$CH_3OH+H_2O \rightarrow CO_2+6H^++6e^- \quad (6)$$

The air is sent to the air electrode of the fuel battery 97 from the valves 77, 76, 78. Then, as shown in Electrochemical Reaction Formula (7), oxygen in the air, the hydrogen ions passed through the solid polymer electrolytic film and the electrons extracted by the fuel electrode cause a reaction to produce water.

$$6H^++3/2O_2+6e^- \rightarrow 3H_2O \quad (7)$$

As described above, the electrochemical reactions indicated by (6), (7) are caused in the fuel battery 97 to generate electric energy. A mixture gas of carbon dioxide as a by-product, air and the like is discharged to the outside through the valves 82, 83.

The water 12 contained in the fuel container 1 is used during an initial operation for power generation in the power generation unit 91. However, after the initial operation, water produced in the power generation unit 91 during the power generation as shown in Chemical Reaction Formula (5) or (7) may be again supplied to the power generation unit 91 by the pump 72 and thus used as water of a reaction system on a left side indicated in Chemical Reaction Formula (1) or (6). Alternatively, both this water and the water 12 contained in the fuel container 1 may be used. Moreover, when the water 12 contained in the fuel container 1 has completely run out, the water produced in the power generation unit 91 may only be supplied to the power generation unit 91 by the pump 72 regardless of the initial operation for power generation in the power generation unit 91.

When the power generation unit 91 is provided in a main body of an electronic device such as a mobile telephone, a notebook-type personal computer, a digital camera, a personal digital assistance (PDA) or an electronic diary, the fuel container 1 is detachable from the main body of the electronic device, and the main body of the electronic device operates with electric energy generated by the power generation unit 91. In other words, the electronic device can be applied as the fuel consumption device 60.

It is to be noted that the present invention is not limited to the embodiment described above, and various improvements and design modifications may be made without departing from the spirit of the present invention.

In the embodiment described above, only the water 12 and the liquid fuel 14 are stored in the fuel container 1, but other substances may be added or stored in the fuel container 1. In other words, this is possible as long as a plurality of kinds of fluids is separately stored, the respective kinds of fluids are discharged from separate outlets and all the outlets are provided in the same surface.

Furthermore, in the embodiment described above, one fuel outlet 31 is provided in the outer surface 3a of the front lid portion 3, but a plurality of fuel outlets 31 may be provided in the same outer surface 3a of the front lid portion 3. In the same manner, a plurality of oxygen source outlets 32 or/and a plurality of water outlets 33 may be provided in the same outer surface 3a of the front lid portion 3.

Still further, in the embodiment, the fuel outlet 31, the oxygen source outlet 32 and the water outlet 33 are provided in the same outer surface 3a of the front lid portion 3, but the fuel outlet 31 and the oxygen source outlet 32 may be provided in the same outer surface 3a of the front lid portion 3 without providing the water outlet 33, or the fuel outlet 31 and the water outlet 33 may be provided in the same outer surface 3a of the front lid portion 3 without providing the oxygen source outlet 32.

Second Embodiment

A second embodiment of the present invention will hereinafter be described with the drawings. However, while technically preferable various limitations are imposed on the embodiment described below to implement the present invention, the scope of the invention is not limited to the following embodiment and illustrated examples.

Figure 11:
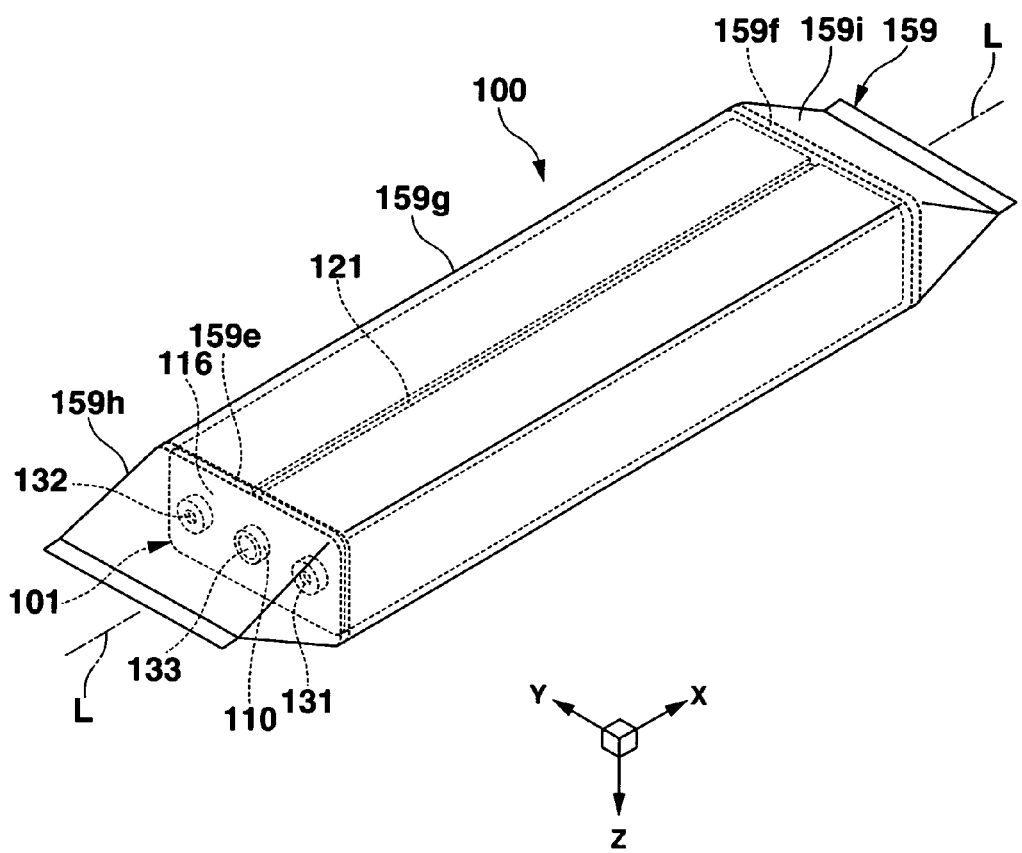
FIG. 11 is a perspective view of a fuel container according to a second embodiment of the present invention.

FIG. 11 is a perspective view of a fuel container 100 in the embodiment to which the present invention is applied. As shown in FIG. 11, the fuel container 100 includes a container main body 101 substantially in a rectangular parallelepiped shape containing a liquid fuel, and a packing material 159 packing the container main body 101.

Figure 12:
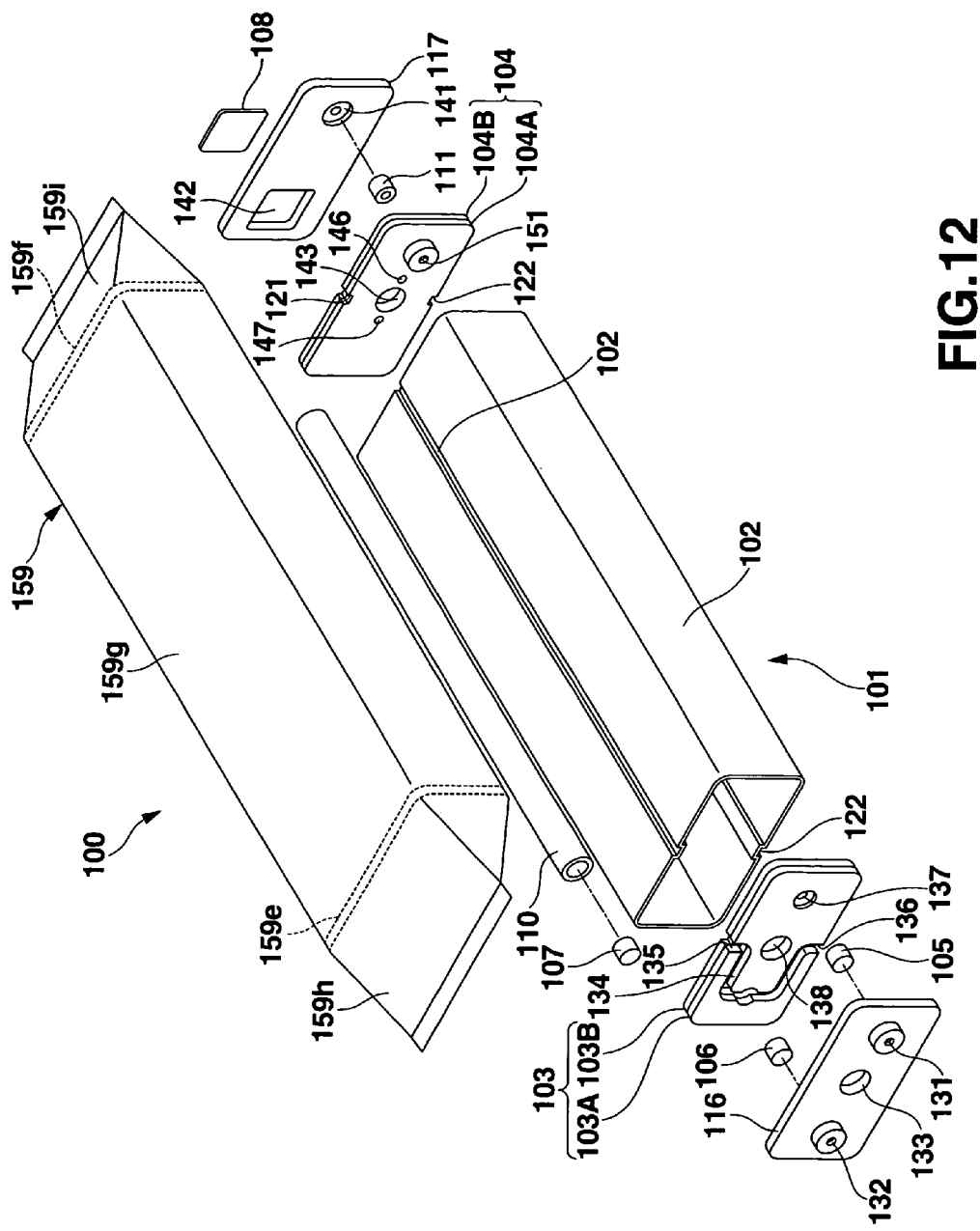
FIG. 12 is an exploded perspective view of the fuel container.
Figure 13:
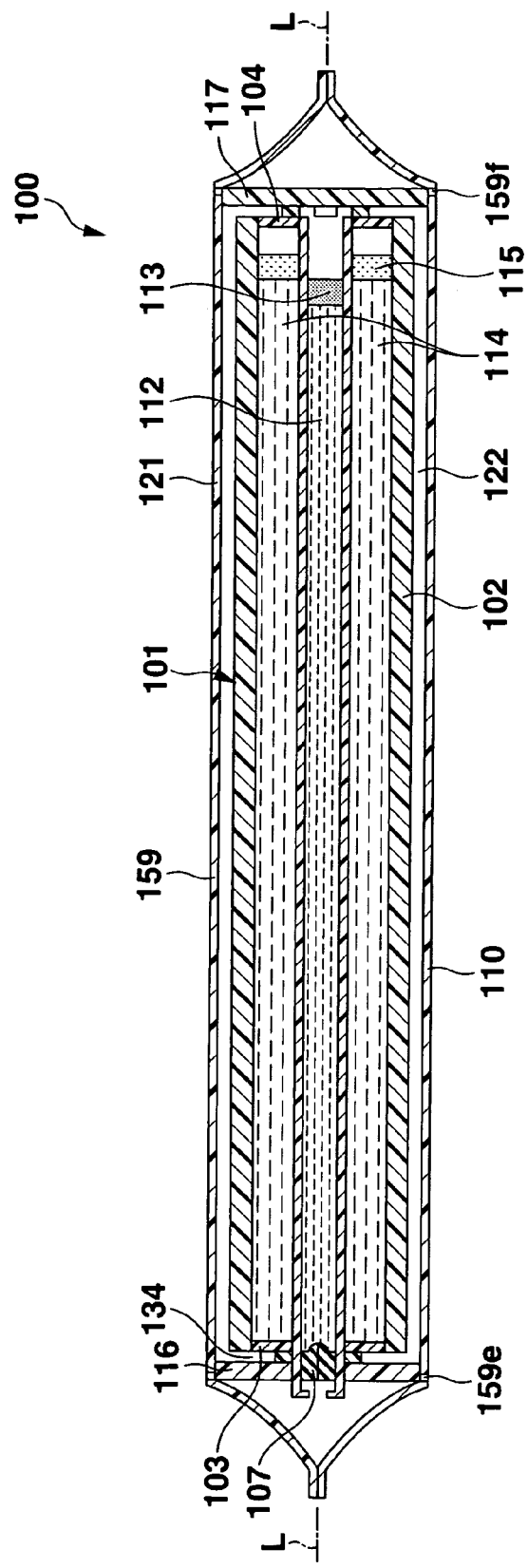
FIG. 13 is a longitudinal sectional view along a center line of the fuel container.
Figure 14:
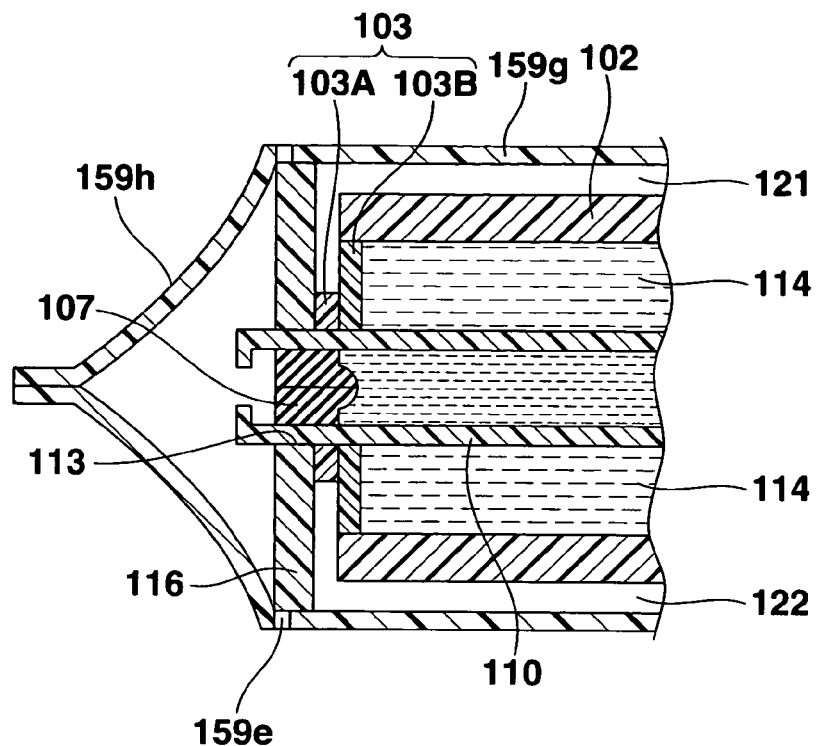
FIG. 14 is a diagram in which a front portion of the fuel container is enlarged in the longitudinal sectional view of FIG. 13.
Figure 15:
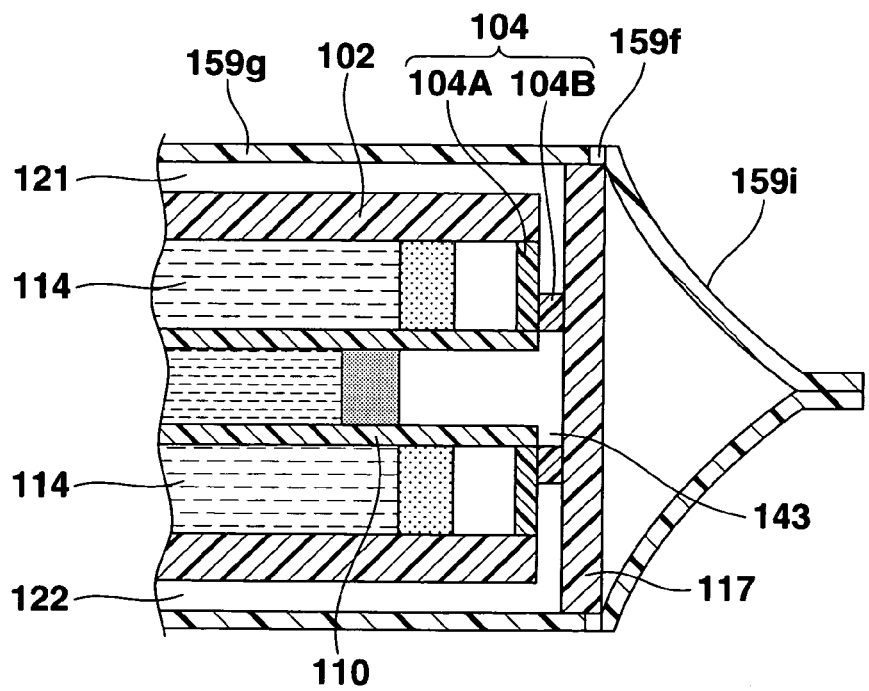
FIG. 15 is a diagram in which a rear portion of the fuel container is enlarged in the longitudinal sectional view of FIG. 13.
Figure 16:
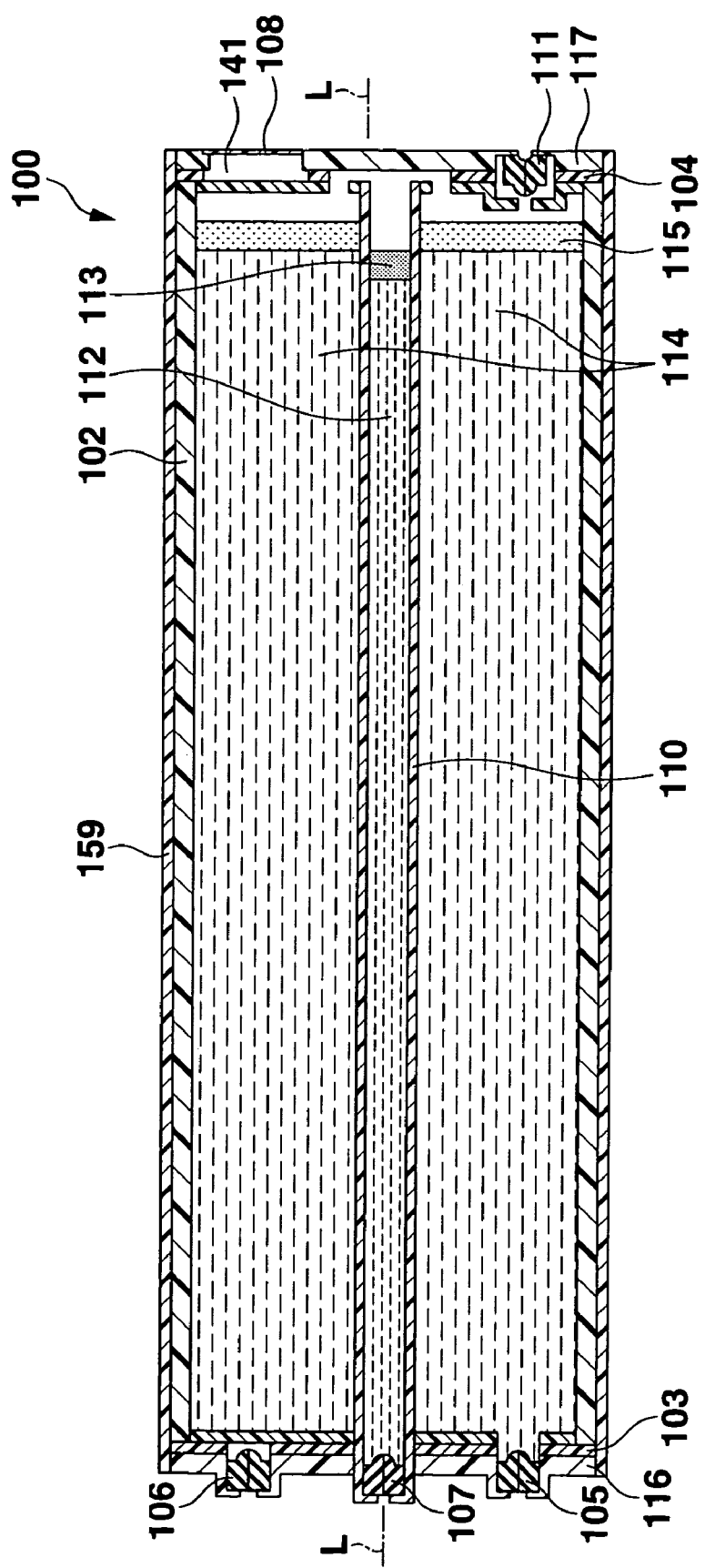
FIG. 16 is a transverse sectional view along the center line of the fuel container.
Figure 17:
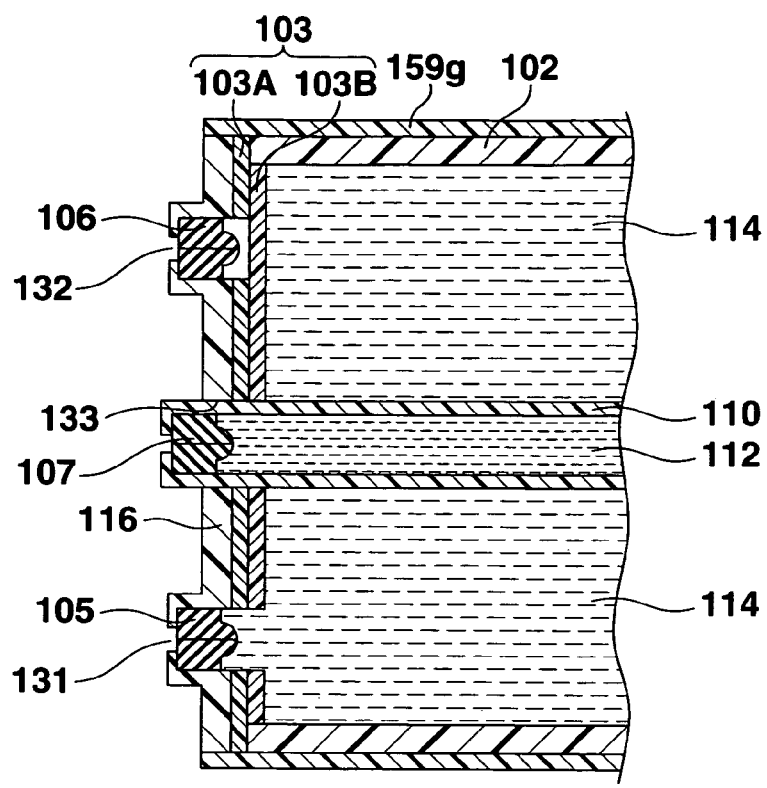
FIG. 17 is a diagram in which the front portion of the fuel container is enlarged in the transverse sectional view of FIG. 16.
Figure 18:
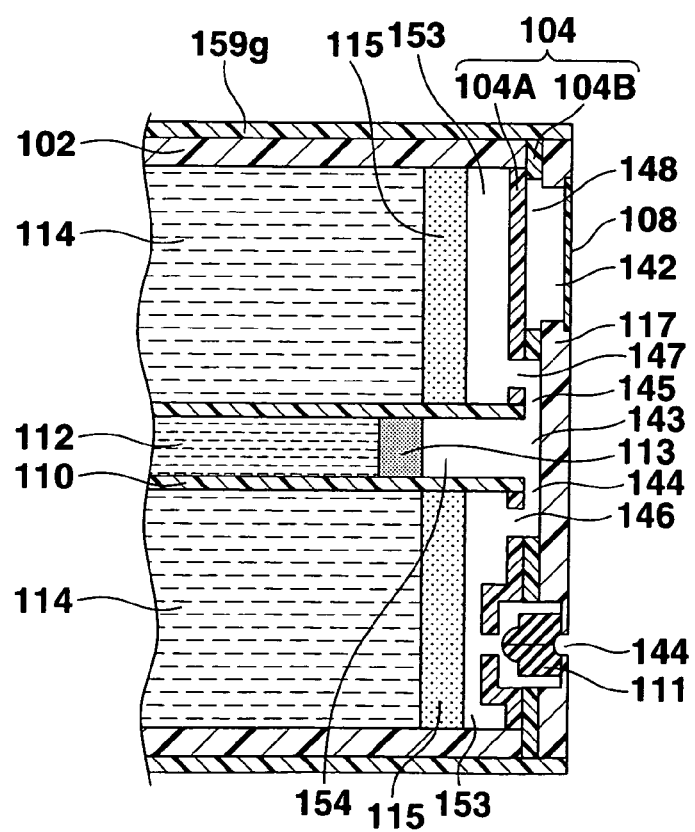
FIG. 18 is a diagram in which the rear portion of the fuel container is enlarged in the transverse sectional view of FIG. 16.

The container main body 101 will be explained with FIGS. 11 to 18. Here, FIG. 12 is an exploded perspective view of the fuel container 100. FIG. 13 is an end elevation showing a cut surface passing a center line which extends along a longitudinal direction X of the fuel container 100 and being in parallel with a thickness direction Z of the fuel container 100 in such a manner as to direct the cut surface in a width direction Y of the fuel container 100. FIG. 14 is a diagram in which a front portion of the fuel container 100 is enlarged in the end elevation of FIG. 13. FIG. 15 is a diagram in which a rear portion of the fuel container 100 is enlarged in the end elevation of FIG. 13. FIG. 16 is an end elevation showing a cut surface passing the center line L and being in parallel with the width direction Y of the fuel container 100 in such a manner as to direct the cut surface in the thickness direction Z of the fuel container 100. FIG. 17 is a diagram in which the front portion of the fuel container 100 is enlarged in the end elevation of FIG. 16. FIG. 18 is a diagram in which the rear portion of the fuel container 100 is enlarged in the end elevation of FIG. 16. It is to be noted that in FIGS. 16 to 18, edge portions 159h, 159i of the packing material 159 are not shown for clarity of the drawings.

The container main body 101 is made of a suitable material such as synthetic resin or a metal, and includes a hollow portion 102 serving as a wall to separate a liquid fuel 114. Various members are attached to the hollow portion 102 to constitute the container main body 101.

The hollow portion 102 is a rectangular pipe whose inside is hollow, and a front end and a rear end of the hollow portion 102 are open, and the hollow portion 102 is formed in a rectangular frame shape when viewed in the longitudinal direction X.

Flow path grooves 121, 122 are concavely provided in two outer side surfaces (a bottom surface and a top surface) opposite in the thickness direction Z in the hollow portion 102. The flow path grooves 121, 122 linearly extend from the rear end to the front end of the hollow portion 102.

A water containing pipe 110 is provided in the hollow portion 102. The water containing pipe 110 extends along the longitudinal direction X of the hollow portion 102.

An opening on a front end side of the hollow portion 102 is closed by a front inner lid portion 103. A rear surface of a front outer lid portion 116 is joined to a front surface of the front inner lid portion 103. Further, an opening on a rear end side of the hollow portion 102 is closed by a rear inner lid portion 104. A front surface of a rear outer lid portion 117 is joined to a rear surface of the rear inner lid portion 104.

The front inner lid portion 103 includes a first layer 103A, and a second layer 103B adhesively bonded firmly to the first layer 103A. A peripheral edge of the first layer 103A is larger than a peripheral edge of the second layer 103B. The peripheral edge of the first layer 103A corresponds to an outer edge on the front end side of the hollow portion 102. The peripheral edge of the second layer 103B corresponds to an inner edge of a front side opening of the hollow portion 102. Further, the peripheral edge of the second layer 103B is positioned closer to the inside than the peripheral edge of the first layer 103A for a wall thickness of the front end of the hollow portion 102. Therefore, in a state where the front inner lid portion 103 closes the front opening of the hollow portion 102, the second layer 103B is fitted into the front opening of the hollow portion 102 and thus the peripheral edge of the second layer 103B closely contacts an inner wall of the hollow portion 102, and the first layer 103A overlaps the front end surface of the hollow portion 102 so that the peripheral edge of the first layer 103A corresponds to the outer edge of the hollow portion 102.

The rear inner lid portion 104 includes a first layer 104A, and a second layer 104B adhesively bonded firmly to the first layer 104A. A peripheral edge of the first layer 104A is smaller than a peripheral edge of the second layer 104B. The peripheral edge of the first layer 104A corresponds to an inner edge of a rear opening of the hollow portion 102. The peripheral edge of the second layer 104B corresponds to an outer edge on a rear end side of the hollow portion 102. The peripheral edge of the first layer 104A is positioned closer to the inside than the peripheral edge of the second layer 104B for a wall thickness of the rear end of the hollow portion 102. Therefore, in a state where the rear inner lid portion 104 is fitted into the hollow portion 102, the peripheral edge of the first layer 104A closely contacts the inner wall of the hollow portion 102, and the second layer 104B overlaps the rear end surface of the hollow portion 102 so that the peripheral edge of the second layer 104B corresponds to the peripheral edge of the hollow portion 102.

Figure 19:
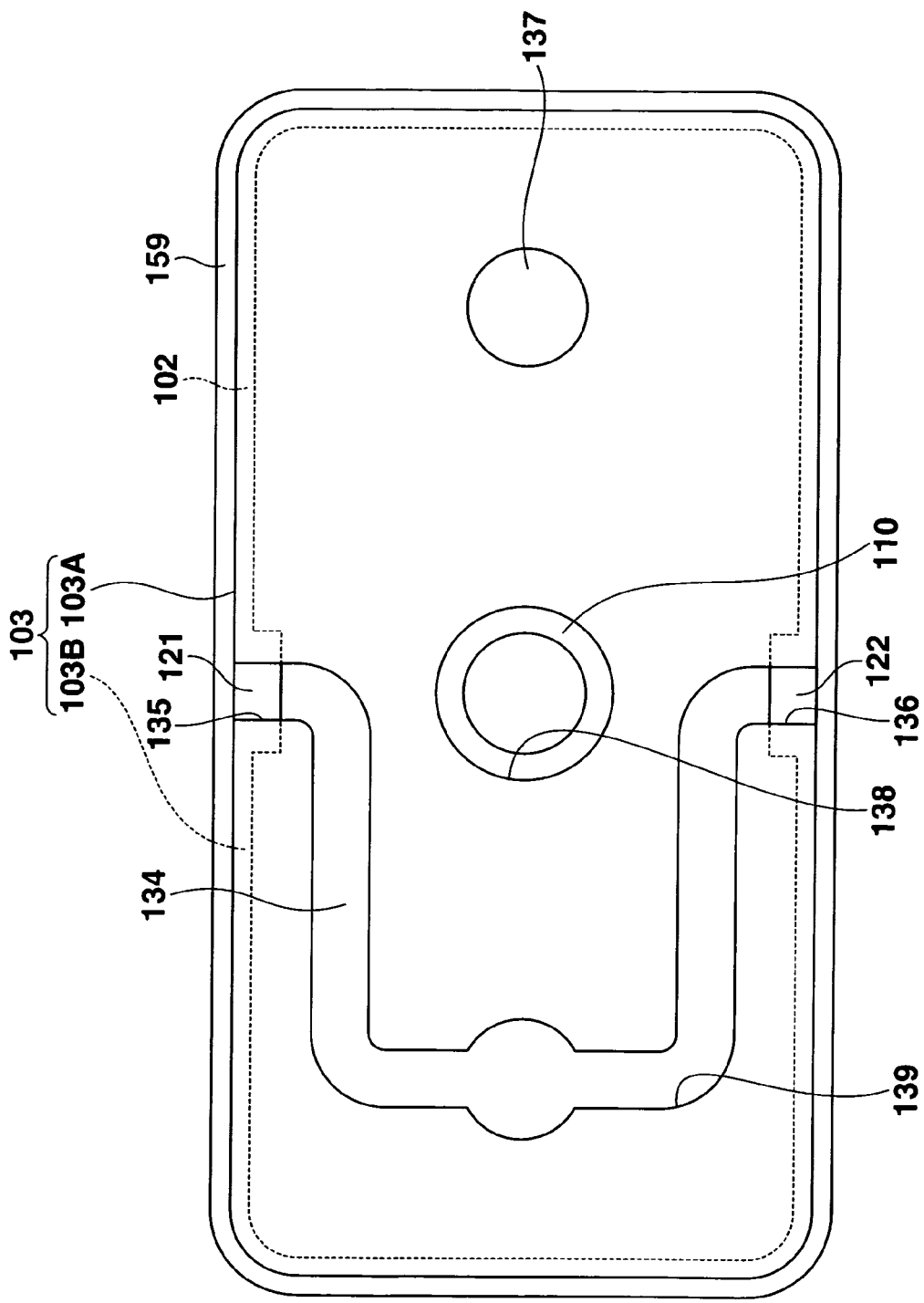
FIG. 19 is a plan view of a front surface of a front inner lid portion of the fuel container.

FIG. 19 is a plan view of the front inner lid portion 103 viewed from the first layer 103A side. As shown in FIG. 19, a water outlet 138 is perforated through the first layer 103A and the second layer 103B in a central portion of the front inner lid portion 103. On a right side of the water outlet 138, a fuel outlet 137 is perforated through the first layer 103A and the second layer 103B. A connection hole 139 is perforated in the first layer 103A of the front inner lid portion 103, and a rear end except for upper and lower ends of the connection hole 139 is closed by the second layer 103B, thereby forming a front flow path groove 134 with the second layer 103B as a bottom surface. The front flow path groove 134 is continuously formed from a position overlapping a front end of the flow path groove 121 to a position overlapping a front end of the flow path groove 122, bends to avoid the water outlet 138, and is wider at a position corresponding to an oxygen source outlet 132 described later. Moreover, a notch 135 is formed at an edge of the front inner lid portion 103 and at one end of the front flow path groove 134. The front flow path groove 134 and the flow path groove 121 are in communication via the notch 135. In the same manner, a notch 136 is formed at the opposite edge and at the other end of the front flow path groove 134. The front flow path groove 134 and the flow path groove 122 are in communication via the notch 136.

Figure 20:
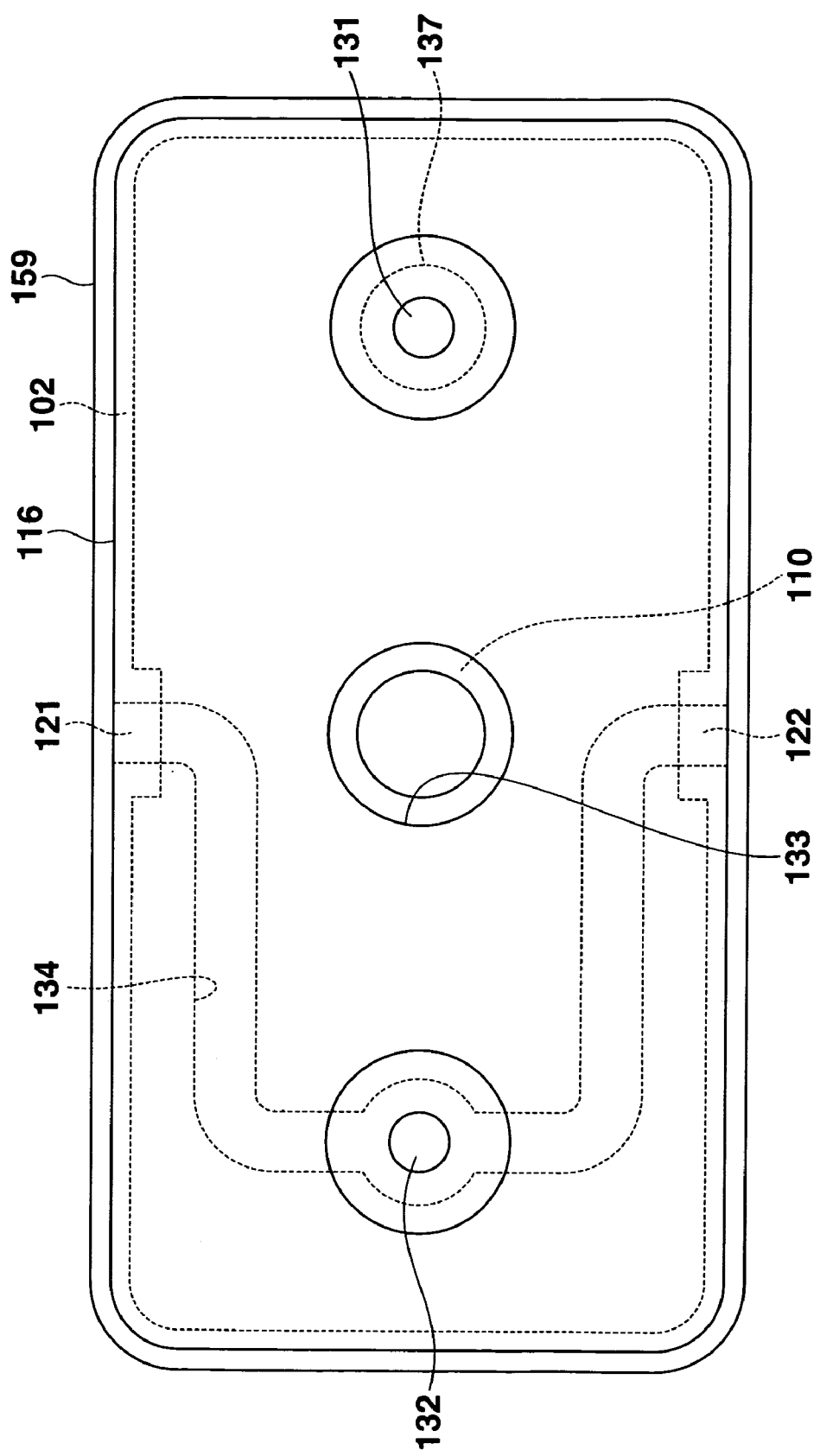
FIG. 20 is a plan view of the front surface in a state where a front outer lid portion is superposed on the front inner lid portion of the fuel container.

As shown in FIG. 20, since the front outer lid portion 116 is superposed on the first layer 103A of the front inner lid portion 103, the front flow path groove 134 is covered with the front outer lid portion 116, and a flow path by the front flow path groove 134 is formed. A fuel outlet 131, the oxygen source outlet 132 and a water outlet 133 are perforated in the front outer lid portion 116. The water outlet 133 is formed in a central portion of the front outer lid portion 116. The fuel outlet 131, the water outlet 133 and the oxygen source outlet 132 are linearly arranged in this order along the width direction of the fuel container 100. Moreover, the fuel outlet 131 faces the fuel outlet 137 of the front inner lid portion 103, and the water outlet 133 faces the water outlet 138 of the front inner lid portion 103.

As shown in FIGS. 14, 17, the fuel outlet 131 and the oxygen source outlet 132 penetrate from the rear surface to front surface of the front outer lid portion 116, and circumferences of the fuel outlet 131 and the oxygen source outlet 132 are convexly provided in a nipple shape on the front surface of the front outer lid portion 116. The water outlet 133 also penetrates from the rear surface to front surface of the front outer lid portion 116, but a circumference of the water outlet 133 is flatly provided.

Into the fuel outlet 131 and the fuel outlet 137, a check valve 105 is fitted to block unnecessary flow of a fluid passing from the inside to the outside of the hollow portion 102 through the fuel outlet 131 and the fuel outlet 137 even if external force is applied to the hollow portion 102. The check valve 105 may be a duck bill valve in which a flexible and elastic material (e.g., an elastomer) is formed in a duck bill shape. The check valve 105 is fitted into the fuel outlet 131 and the fuel outlet 137 in a state where its duck-bill-shaped tip is directed toward the inside of the hollow portion 102.

The oxygen source outlet 132 overlaps a middle portion between one end and the other end of the front flow path groove 134, and communicates with the middle portion of the front flow path groove 134. The front flow path groove 134 is provided to be wider at a position corresponding to the oxygen source outlet 132.

A check valve 106 is fitted into the oxygen source outlet 132 to block unnecessary flow of a fluid passing from the front flow path groove 134 inside the fuel container 100 to the outside through the oxygen source outlet 132 even if external force is applied to the hollow portion 102. The check valve 106 may be a duck bill valve in which a flexible and elastic material (e.g., an elastomer) is formed in a duck bill shape. The check valve 106 is fitted into the oxygen source outlet 132 in a state where its duck-bill-shaped tip is directed toward the inside of the hollow portion 102.

The water containing pipe 110 is inserted into the water outlet 133 and the water outlet 138 to penetrate these outlets. One end of the water containing pipe 110 protrudes outside the front surface of the front outer lid portion 116, and this protrusion protrudes substantially as high as the fuel outlet 131 and the oxygen source outlet 132. On the other hand, as shown in FIG. 12, a holding bore 143 is perforated in central portions of the first layer 104A and the second layer 104B of the rear inner lid portion 104. The other end of the water containing pipe 110 is inserted into the holding bore 143 of the first layer 104A, but it does not reach the holding bore 143 of the second layer 104B. Thus, the water containing pipe 110 is built between the front outer lid portion 116 and the rear inner lid portion 104. Moreover, ventilation holes 146, 147 are perforated through the first layer 104A and the second layer 104B on both right and left sides of the holding bore 143 of the rear inner lid portion 104.

In the water containing pipe 110 and closer to the end on the water outlet 133 side, a check valve 107 is fitted to block unnecessary flow of a fluid running from the inside of the water containing pipe 110 to its end opening even if external force is applied to the water containing pipe 110 via the hollow portion 102. The check valve 107 may be a duck bill valve in which a flexible and elastic material (e.g., an elastomer) is formed in a duck bill shape. The check valve 107 is fitted into the water containing pipe 110 in a state where its duck-bill-shaped tip is directed toward the rear inner lid portion 104.

Figure 21:
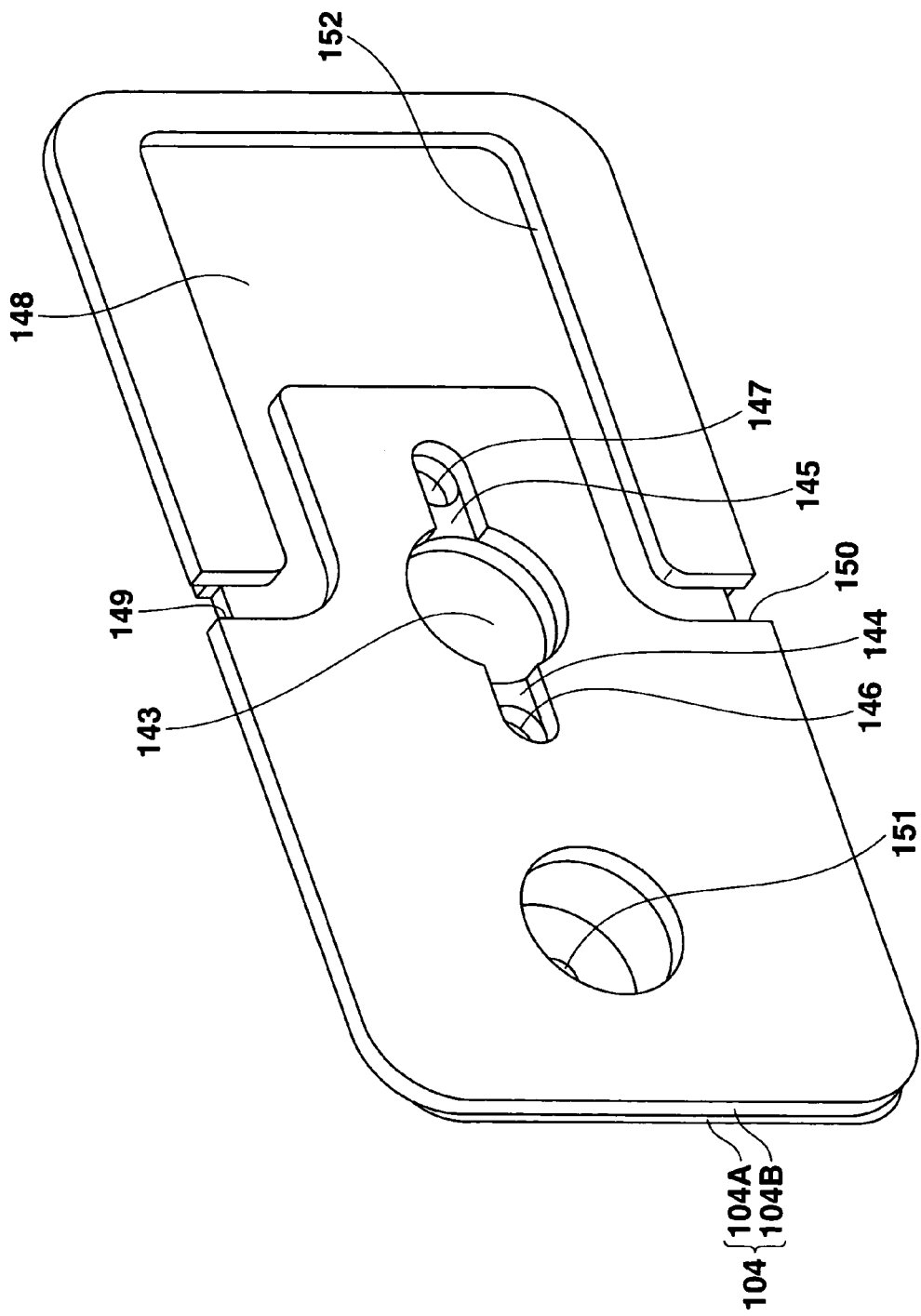
FIG. 21 is a perspective view of a rear inner lid portion of the fuel container.

FIG. 21 is a perspective view of the rear inner lid portion 104 viewed from the second layer 104B side. As shown in the figure, openings are formed in the second layer 104B of the rear inner lid portion 104, which are opened continuously from the holding bore 143 on both right and left sides of the holding bore 143. These openings partially correspond to the ventilation holes 146, 147. In the first layer 104A of the rear inner lid portion 104, no opening is formed in areas which do not overlap the ventilation holes 146, 147, that is, an area between the holding bore 143 and the ventilation hole 146 and an area between the holding bore 143 and the ventilation hole 147. These parts without opening correspond to a bottom of a lateral groove 144 connecting the holding bore 143 and the ventilation hole 146 and a bottom of a lateral groove 145 connecting the holding bore 143 and the ventilation hole 147.

In the second layer 104B of the rear inner lid portion 104, another opening 152 is provided, and thus a rear flow path groove 148 is formed which utilizes the first layer 104A facing the opening 152 as a bottom. The rear flow path groove 148 is continuously formed from a position overlapping a rear end of the flow path groove 121 to a position overlapping a rear end of the flow path groove 122, and bends to avoid the holding bore 143. Moreover, a notch 149 is formed at an edge of the rear inner lid portion 104 and at one end of the rear flow path groove 148. The rear flow path groove 148 and the flow path groove 121 are in communication via the notch 149. In the same manner, a notch 150 is formed at the opposite edge and at the other end of the rear flow path groove 148. The rear flow path groove 148 and the flow path groove 122 are in communication via the notch 150.

Figure 22:
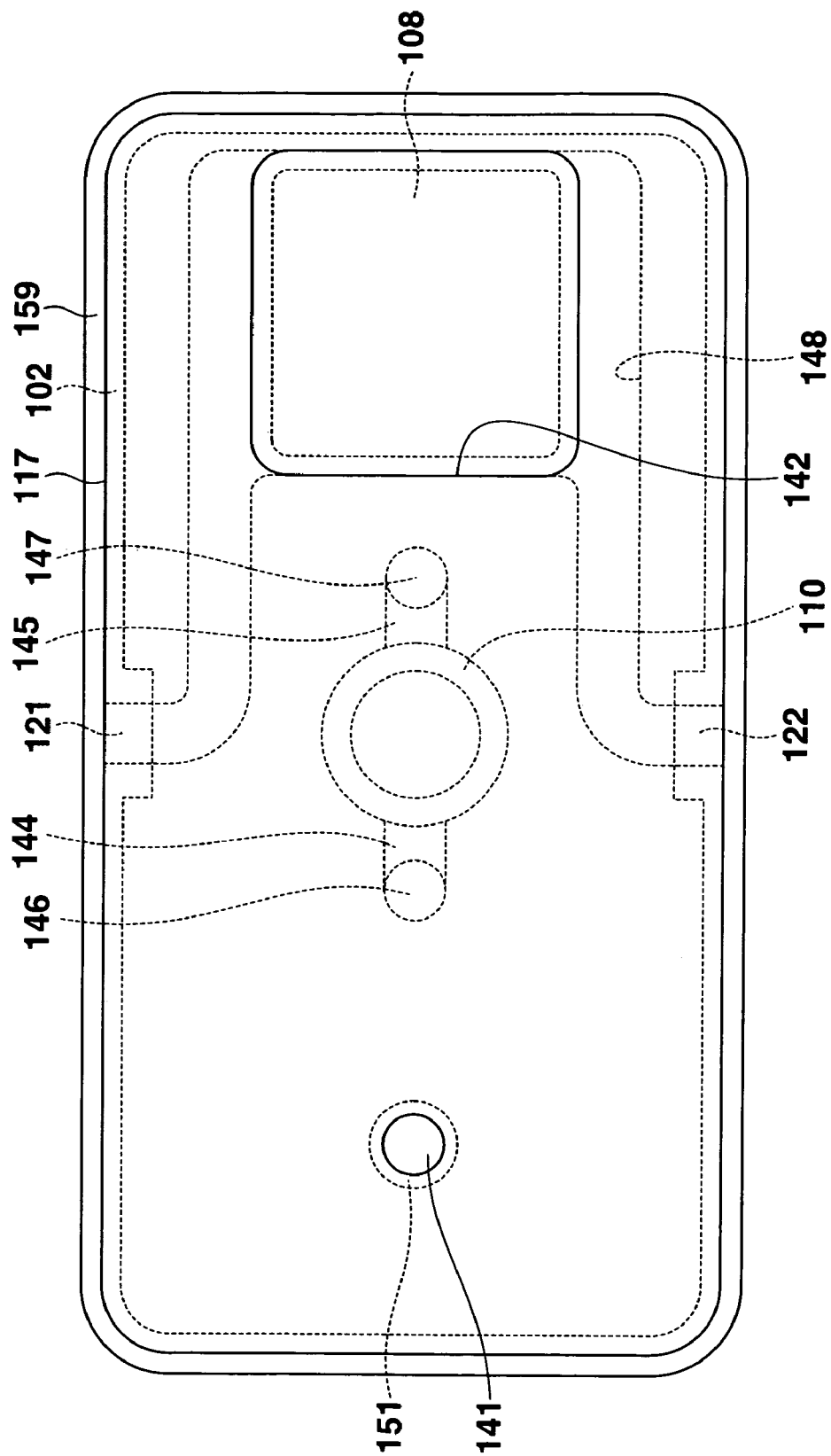
FIG. 22 is a plan view of the rear surface in a state where a rear outer lid portion is superposed on the rear inner lid portion of the fuel container.

As shown in FIG. 22, the rear outer lid portion 117 is superposed on the rear inner lid portion 104 so that the rear flow path groove 148 is covered with the rear outer lid portion 117, and a flow path by the rear flow path groove 148 is formed. As shown in FIGS. 12, 16, 18, a first air introduction port 141 and a second air introduction port 142 are perforated in the rear outer lid portion 117. The first air introduction port 141 is formed at a position corresponding to the fuel outlet 131, and the second air introduction port 142 is formed at a position corresponding to the oxygen source outlet 132.

The first air introduction port 141 penetrates from a front surface to a rear surface of the rear outer lid portion 117. A ventilation hole 151 (FIG. 12) is perforated at a position corresponding to the first air introduction port 141 and in the rear inner lid portion 104. The second layer 104B is convexly provided in a nipple shape around the ventilation hole 151. A check valve 111 is fitted in the first air introduction port 141 to block flow of a fluid passing from the inside to the outside of the hollow portion 102 through the ventilation hole 151 and the first air introduction port 141. The check valve 111 may be a duck bill valve in which a flexible and elastic material (e.g., an elastomer) is formed in a duck bill shape, and the check valve 111 is fitted into the first air introduction port 141 in a state where its duck-bill-shaped tip is directed to the inside of the hollow portion 102. An air space 153 (FIG. 18) is disposed on a tip side of the liquid fuel 114 and increases capacity as the liquid fuel 114 is consumed. An air space 154 is disposed on a tip side of a water 112 and increases capacity as the water 112 is consumed. The air spaces 153, 154 are in communication with each other via the ventilation holes 146, 147, the lateral grooves 144, 145 and the holding bore 143 of the rear inner lid portion 104, and thus have the same inner pressure. The check valve 111 allows inflow of air from the outside of the fuel container 100 to buffer a pressure difference when pressures in the air spaces 153, 154 are extremely lower than a pressure outside the fuel container 100.

The second air introduction port 142 is formed in a rectangular shape. The second port 142 overlaps a middle portion between both ends of the rear flow path groove 148, and communicates with the middle portion of the flow path groove 148. The groove 148 is provided to be wider at a position corresponding to the second air introduction port 142.

A dustproof filter 108 is fitted into the second air introduction port 142, and the port 142 is closed by the filter 108.

As shown in FIGS. 13 to 18, a follower 113 is contained in the water containing pipe 110 to contact the end of the water body (the rear inner lid portion 104 side). Since the follower 113 is in contact with an inner wall of the water containing pipe 110, a space in the water containing pipe 110 is divided into an area on the front inner lid portion 103 side and an area on the rear inner lid portion 104 side by the follower 113. The follower 113 is a liquid with a low affinity for the water 112 such as sol or gel, and is a highly viscous liquid having viscosity higher than that of the water 112 and being insoluble in the water 112. The follower 113 has a property of a structurally viscous fluid (anomalously viscous fluid) which reduces apparent stress when shear stress (or shear rate) increases. Therefore, if the water 112 is discharged from the water outlet 133 and the end of the water body on the rear inner lid portion 104 side approaches the water outlet 133 side, the follower 113 follows so that no gap is produced between the end of the water body and the water outlet 133. Thus, the follower 113 closes the end of the water body in the water containing pipe 110, so that as long as the water 112 remains in the water containing pipe 110 on the water outlet 133 side, the water 112 is filled without gap caused, for example, by as air. Therefore, even if the fuel container 100 is tilted to bring the water outlet 133 on an upper side, the water 112 is easily discharged from the water outlet 133 because the water 112 has reached the water outlet 133. Moreover, the follower 113 can suppress volatilization of the water 112. Polybutene, liquid paraffin, spindle oil, other mineral oils, dimethyl silicone oil, methyl phenyl silicone oil, other silicone oils, and a combination of these can be used as the follower 113. It is to be noted that since the check valve 107 is provided in the water containing pipe 110, the water 112 in the water containing pipe 110 does not unnecessarily leak out.

A follower 115 is contained in the hollow portion 102 to contact the end of the liquid fuel body (the rear inner lid portion 104 side). Since the follower 115 is in contact with the inner wall of the hollow portion 102, a space in the hollow portion 102 is divided into an area on the front inner lid portion 103 side and an area on the rear inner lid portion 104 side by the follower 115. The follower 115 is a liquid with a low affinity for the liquid fuel 114 such as sol or gel, and is a highly viscous liquid having viscosity higher than that of the liquid fuel 114 and being insoluble in the liquid fuel 114. The follower 115 has the property of the structurally viscous fluid (anomalously viscous fluid) which reduces the apparent stress when the shear stress (or shear rate) increases. Therefore, if the liquid fuel 114 is discharged from the fuel outlet 131 and the end of the liquid fuel body on the rear inner lid portion 104 side approaches the fuel outlet 131 side, the follower 113 follows so that no gap is produced between the end of the liquid fuel 114 and the follower 115. Thus, the follower 113 closes the end of the liquid fuel body in the hollow portion 102, so that as long as the liquid fuel 114 remains in the water containing pipe 110 on the fuel outlet 131 side, the liquid fuel 114 is filled without gap caused, for example, by air. Therefore, even if the fuel container 100 is tilted to bring the fuel outlet 131 on the upper side, the liquid fuel 114 is easily discharged from the fuel outlet 131 because the liquid fuel 114 has reached the fuel outlet 131. Moreover, the follower 115 can suppress volatilization of the liquid fuel 114. Specifically, polybutene, liquid paraffin, spindle oil, other mineral oils, dimethyl silicone oil, methyl phenyl silicone oil, other silicone oils, and a combination of these can be used as the follower 115. It is to be noted that since the check valve 105 is provided in the fuel outlet 131, the liquid fuel 114 in the hollow portion 102 does not unnecessarily leak out even if external force is applied to the hollow portion 102 in this state.

The air space 153 closer to the rear inner lid portion 104 than the follower 115 is in communication with a rear opening of the water containing pipe 110 via the ventilation holes 146, 147 and the lateral grooves 144, 145 of the rear inner lid portion 104.

As described above, the main body 101 is packed by the packing material 159. The packing material 159 is formed of a synthetic resin which does not sufficiently permeate air. The packing material 159 preferably packs the main body 101 by vacuum suction therein.

The packing material 159 includes a trunk winding portion 159g wound around a trunk of the hollow portion 102; the first edge portion 159h extending forward from the trunk winding portion 159g to seal a front end surface of the container main body 101 (the front surface of the front outer lid portion 116); and the second edge portion 159i extending rearward from the trunk winding portion 159g to seal a rear end surface of the container main body 101 (the rear surface of the rear outer lid portion 117). The fuel outlet 131, the oxygen source outlet 132 and the water outlet 133 are covered with the first edge portion 159h, while the first air introduction port 141 and the second air introduction port 142 are covered with the second edge portion 159i. Further, by covering the hollow portion 102 with the trunk winding portion 159g of the packing material 159, the flow path grooves 121, 122 serve as flow paths for air. The flow path grooves 121, 122 are concavely provided to satisfy $W1 > (S1/2\pi)^{1/2}$, wherein S1 is a cross sectional area of the flow path groove 121, 122, and W1 is a width of the flow path groove 121, 122.

A cutoff line 159e along an edge of the front surface of the front outer lid portion 116 is formed between the trunk winding portion 159g and the first edge portion 159h. A cutoff line 159f along an edge of the rear surface of the rear outer lid portion 117 is formed between the trunk winding portion 159g and the second edge portion 159i. By cutting the packing material 159 along the cutoff line 159e, the first edge portion 159h can be easily separated from the trunk winding portion 159g. By cutting the packing material 159 along the cutoff line 159f, the second edge portion 159i can be easily separated from the trunk winding portion 159g. It is to be noted that the trunk winding portion 159g is preferably adhesively bonded to an outer surface of the hollow portion 102, the edge of the front outer lid portion 116, the edge of the rear outer lid portion 117, the edge of the first layer 103A of the front inner lid portion 103, the edge of the second layer 104B of the rear inner lid portion 104.

Since the unused container main body 101 is sealed with the packing material 159, it is possible to prevent the liquid fuel 114 from being discharged from the fuel outlet 131 or to prevent the water 112 from being discharged from the water outlet 133. Moreover, since the dustproof filter 108 is not exposed in the second air introduction port 142, deterioration of the filter can be prevented.

When the container main body 101 is coupled to a fuel battery or to a unit having a fuel battery, the first edge portion 159h is separated from the trunk winding portion 159g along the cutoff line 159e by pulling the first edge portion 159h to expose the fuel outlet 131, the oxygen source outlet 132 and the water outlet 133, in order that the water 112 and the liquid fuel 114 can be supplied to the fuel battery or the like from the container main body 101. In the same manner, the second edge portion 159i is separated from the trunk winding portion 159g along the cutoff line 159f by pulling the second edge portion 159i to expose the first air introduction port 141 and the second air introduction port 142. Subsequently, the container main body 101 in a state where the trunk winding portion 159g remains is set in the fuel battery or to the unit having the fuel battery.

Figure 23:
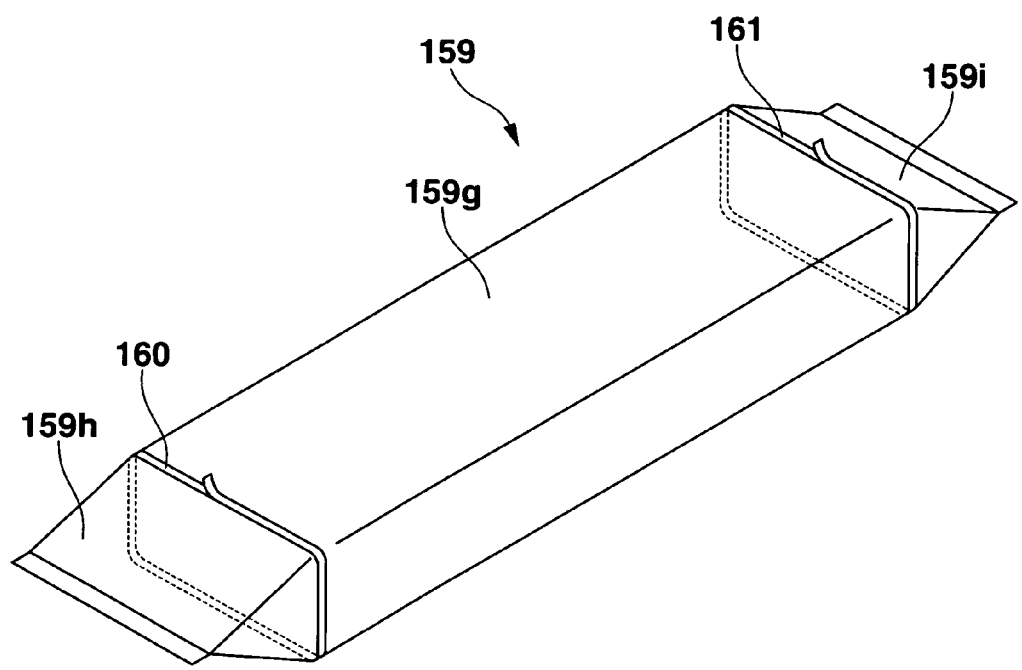
FIG. 23 is a perspective view of a modification of a packing material.

As described above, when the container main body 101 is unused (shipped), the front surface of the front outer lid portion 116 and the rear surface of the rear outer lid portion 117 are covered with the packing material 159. Further, as shown in FIG. 23, a small cut is made in a portion between the trunk winding portion 159g and the first edge portion 159h, and a cut-off guide tape 160 is provided along a peripheral edge of the front outer lid portion 116 so that an end of the tape overlaps the cut, and thus the first edge portion 159h may be peeled off by pulling the cut-off guide tape 160 in a direction of the peripheral edge of the front surface of the front outer lid portion 116. It is to be noted that the cutoff line 159e is desirably provided under the cut-off guide tape 160 so that the flow path grooves 121, 122 are not exposed.

A small cut is made in a portion between the trunk winding portion 159g and the second edge portion 159i, and a cut-off guide tape 161 is provided along a peripheral edge of a front surface of the rear outer lid portion 117 so that an end of the tape overlaps the cut, and thus the second edge portion 159i may be peeled off by pulling the cut-off guide tape 161 in a direction of the peripheral edge of the rear outer lid portion 117. It is to be noted that the cutoff line 159f is desirably provided under the cut-off guide tape 161 so that the flow path grooves 121, 122 are not exposed.

Figure 24:
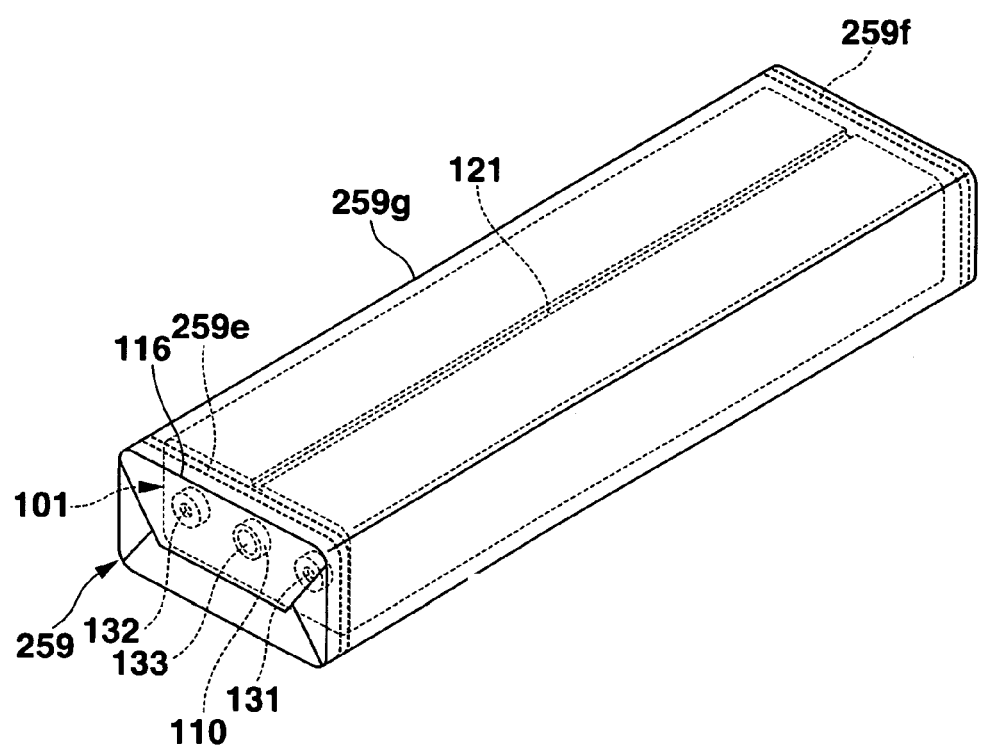
FIG. 24 is a perspective view of a state in which a container main body is packed in another packing material.

Furthermore, the main body 101 may be packed by a packing material 259 as shown in FIG. 24, instead of the packing material 159. The packing material 259 is formed of a synthetic resin which does not sufficiently permeate air. The packing material 259 preferably packs the container main body 101 by vacuum suction therein.

Figure 25:
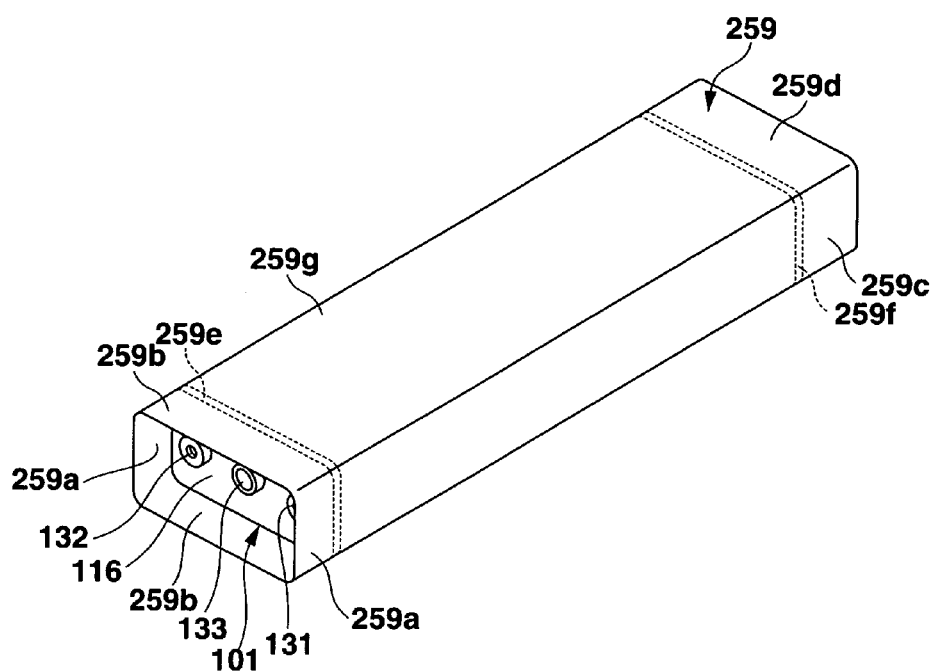
FIG. 25 is a perspective view to explain a packing process of the packing material.

The fuel container 100 is packed by the packing material 259 having a structure shown in FIG. 24 in the following process. As shown in FIG. 25, the packing material 259 is wound around the trunk of the hollow portion 102 so that gaps in the flow path grooves 121, 122 are not collapsed, and a trunk winding portion 259g of the packing material 259 is placed in close contact with the outer surface of the hollow portion 102. Then, a pair of edge portions 259a on a short side extending forward from the front surface of the front outer lid portion 116 is first bent inward, and a pair of edge portions 259b on a long side is then bent, and overlapping portions of the edge portions 259a, 259b are adhesively bonded. Thus, the front surface of the front outer lid portion 116 is covered with the edge portions 259a, 259b, and the fuel outlet 131, the oxygen source outlet 132 and the water outlet 133 are sealed by the edge portions 259a, 259b. In the same manner, for a rear side, a pair of edge portions 259c on a short side extending from the rear surface of the rear outer lid portion 117 is bent inward, and a pair of edge portions 259d on a long side is then bent, and overlapping portions of the edge portions 259c, 259d are adhesively bonded. Thus, the rear surface of the rear outer lid portion 117 is covered with the edge portions 259*c*, 259*d*, and the first air introduction port 141 and the second air introduction port 142 are sealed by the edge portions 259*c*, 259*d*.

When the main body 101 is packed as described above, the fuel outlet 131, the oxygen source outlet 132 and the water outlet 133 are covered with the edge portions 259*a*, 259*b* of the packing material 159, and the air introduction ports 141, 142 are covered with the edge portions 259*c*, 259*d*. Therefore, a keeping quality of the liquid fuel 114 contained in the hollow portion 102 can be increased. Such packing with the high keeping quality is simple as well.

As shown in FIG. 24, a cutoff line 259*e* along the edge of the front surface of the front outer lid portion 116 is formed in the packing material 259, and a cutoff line 259*f* along the edge of the rear surface of the rear outer lid portion 117 is formed in the packing material 259. In use, as shown in FIG. 25, by cutting the edge portions 259*a*, 259*b* along the cutoff line 259*e*, the fuel outlet 131, the oxygen source outlet 132 and the water outlet 133 are exposed. On the other hand, by cutting the edge portions 259*c*, 259*d* along the cutoff line 259*f*, the air introduction ports 141, 142 are exposed. In this way, since the cutoff lines 259*e*, 259*f* are formed, the edge portions 259*a*, 259*b*, 259*c*, 259*d* can be easily cut when a user uses the fuel container 100, and the fuel outlet 131, the oxygen source outlet 132, the water outlet 133 and the air introduction ports 141, 142 can easily be exposed.

Since the trunk winding portion 259*g* is wound around the trunk of the hollow portion 102 in a state where the edge portions 259*a*, 259*b*, 259*c*, 259*d* are cut off, the flow paths for air as described above is formed. Moreover, the remaining trunk winding portion 159*g* can prevent the air passing through the flow path grooves 121, 122 from being dispersed before reaching the oxygen source outlet 132.

The sheet-shaped trunk winding portion 159*g* or trunk winding portion 259*g* covers and packs all of the edges of the front outer lid portion 116, the front inner lid portion 103, the rear inner lid portion 104 and the rear outer lid portion 117 as well as a side surface of the hollow portion 102, except for the front surface of the front outer lid portion 116 and the rear surface of the rear outer lid portion 117. Moreover, the side surface of the hollow portion 102 is placed in close contact with or adhesively bonded to the trunk winding portion 159*g* or the trunk winding portion 259*g* except for the notch 135, the notch 136, the notch 149, the notch 150, the flow path groove 121 and the flow path groove 122. By covering the notchs 135, 136, 149, 150, the flow path groove 121 and the flow path groove 122 with the trunk winding portion 159*g* or the trunk winding portion 259*g*, a flow path is formed which passes the air outside the container main body 101 taken in via the second air introduction port 142 to the oxygen source outlet 132.

Thus, the flow path grooves 121, 122 are formed in the outer side surface of the hollow portion 102, and the flow path grooves 121, 122 are covered with the trunk winding portion 159*g* or the trunk winding portion 259*g* formed of the thin synthetic resin of 1 mm or less to form the air passing flow path. It is therefore not necessary to provide a thick pipe or the like to pass the air in the container main body 101. Therefore, an amount of the liquid fuel 114 contained in the capacity of the container main body 101 can be increased. In particular, the amount of the liquid fuel 114 contained can especially be increased if $W1 > (S1/(2 \times \pi))^{1/2}$ is satisfied, wherein S1 is the cross sectional area of the flow path groove 121, 122, and W1 is the width of the flow path groove 121, 122.

The main body 101 in which the trunk winding portion 159*g* is only left is attached to a device which uses the liquid fuel 114 (hereinafter referred to as a fuel consumption device.) to supply the fuel consumption device with the liquid fuel 114 and the water 112. When the liquid fuel 114 in the main body 101 has run out, the main body 101 of the fuel container 100 is detached from the fuel consumption device, and a new main body 101 of the fuel container 100 is attached to the fuel consumption device. The fuel consumption device to which the container main body 101 is attached will be explained below.

The fuel consumption device is provided with a fuel introduction pipe, an air introduction pipe and a water introduction pipe. The fuel introduction pipe corresponds to the fuel outlet 131, the air introduction pipe corresponds to the oxygen source outlet 132, and the water introduction pipe corresponds to a tip of the water containing pipe 110 to the fuel consumption device. Further, the main body 101 is attached to the fuel consumption device in such a manner as to direct the front surface of the front outer lid portion 116 of the main body 101. Thus, the fuel introduction pipe is inserted into the fuel outlet 131, but the fuel introduction pipe is further inserted into the check valve 105 to open the check valve 105. In the same manner, the air introduction pipe is inserted into the check valve 106 in the oxygen source outlet 132, and the water introduction pipe is inserted into the check valve 107 in the water containing pipe 110. Thus, the liquid fuel 114 in the container main body 101 is supplied to the fuel consumption device through the fuel introduction pipe, and the water 112 in the water containing pipe 110 is supplied to the fuel consumption device through the water introduction pipe. Moreover, outside air is sucked into the rear flow path groove 148 through the dustproof filter 108, and passes through the flow path grooves 121, 122, the front flow path groove 134 and the air introduction pipe from the rear flow path groove 148 to be supplied to the fuel consumption device.

Since the fuel outlet 131, the oxygen source outlet 132 and the water outlet 133 are provided in the same surface (that is, the front surface of the front outer lid portion 116), these outlets 131, 132, 133 can be simultaneously connected to the fuel consumption device by one simple attachment operation. Therefore, the attachment operation of the main body 101 can be easily performed.

Furthermore, the dustproof filter 108 is clogged as the main body 101 is used. However, since the dustproof filter 108 is attached to the main body 101, the dustproof filter 108 can be replaced together by replacing the main body 101. Thus, it is not necessary to check the dustproof filter 108.

As shown in FIGS. 13, 16, if the liquid fuel 114 in the main body 101 decreases, the shear stress is thus slowly caused to the follower 115, and the follower 115 follows the front inner lid portion 103 side. If the water 112 in the water containing pipe 110 decrease, the shear stress is thus slowly caused to the follower 113 to reduce a viscosity coefficient of the follower 113, and the follower 113 will follow to the front inner lid portion 103 side as the water 112 is consumed. If the liquid fuel 114 and the water 112 decrease, the space closer to the rear inner lid portion 104 side than the follower 115 is decompressed, but the check valve 111 is opened by the decompression of the space and the outside air is supplied into the space, thus keeping the space substantially at atmospheric pressure. The followers 113, 115 are formed of a material which is not easily moved due to instantaneously occurring shear stress.

Figure 26A:
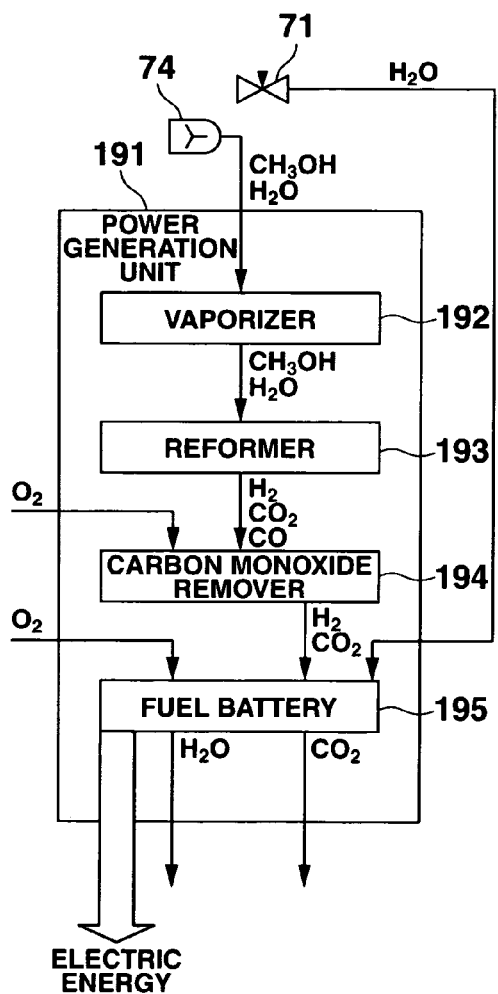
FIGS. 26A and 26B are block diagrams of the different power generation units.
Figure 26B:
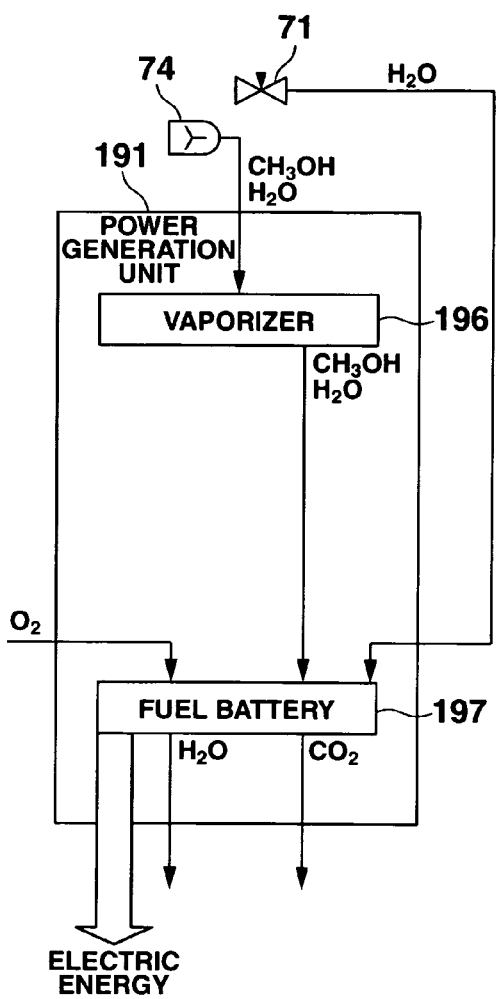

Power generation units 191 as shown in FIGS. 26A and 26B are built in the fuel consumption device. The power generation unit 191 generates power using the liquid fuel 114 in the fuel container 100 and configured as shown in FIG. 26A or 26B. Similarly to the power generation unit 91 shown in FIG. 7, the power generation unit 191 is coupled to the fuel consumption device 60, and has the same function as that of the power generation unit 91. Methanol is taken as an example of the liquid fuel 114 in both cases of FIGS. 26A, 26B, but other compounds including a hydrogen element may be used, such as alcohols and gasoline.

In the case of FIG. 26A, the power generation unit 191 has a vaporizer 192, a reformer 193, a carbon monoxide remover 194 and a fuel battery 195, and has the same structure as that of the power generation unit 91 shown in FIG. 10A.

Before the fuel battery 195 starts power generation, the fuel consumption device 60 starts the water pump 70 and the valve 71 and supplies the water 12 stored in the fuel container 1 to an electrolytic film of the fuel battery 95. Thus, since the electrolytic film is filled with water which hydrates hydrogen ions and ionic conductivity of the electrolytic film can thus be improved before the power generation, the electrolytic film can rapidly conduct the hydrogen ions produced from hydrogen gas when the hydrogen gas has reached the fuel battery 195.

Furthermore, when the electrolytic film of the fuel battery 195 is filled with water, the pump 72 and the valve 73 are actuated, thereby feeding, to the mixer 74, part or all of the water 12 discharged from the valve 71. Thus, the liquid fuel 14 in the fuel container 1 discharged by the fuel pump 68 and the valve 69 of the fuel consumption device 60 is fed to the mixer 74, and mixed with the water 12 in the mixer 74.

The mixture of the liquid fuel 14 and the water 12 mixed in the mixer 74 is supplied to vaporizer 192. In the vaporizer 192, the supplied mixture is heated and thus vaporized, and becomes a mixture gas of the fuel and water. The mixture gas generated in the vaporizer 192 is supplied to the reformer 193.

In the reformer 193, hydrogen and carbon dioxide are generated from the mixture gas supplied from the vaporizer 192. Specifically, carbon dioxide and hydrogen are generated by a reaction between the mixture gas and a catalyst as in Chemical Reaction Formula (8).

$$CH_3OH+H_2O \rightarrow 3H_2+CO_2 \qquad (8)$$

In the reformer 193, methanol and water vapor may not be completely reformed into carbon dioxide and hydrogen, in which case methanol reacts with water vapor to produce carbon dioxide and carbon monoxide as in Chemical Reaction Formula (9).

$$2CH_3OH+H_2O \rightarrow 5H_2+CO+CO_2 \qquad (9)$$

The mixture gas generated in the reformer 193 is supplied to the carbon monoxide remover 194.

In the carbon monoxide remover 194, carbon monoxide contained in the mixture gas supplied from the reformer 193 selectively oxidizes to remove carbon monoxide from the mixture gas. Specifically, carbon monoxide specifically selected from the mixture gas supplied from the reformer 193 reacts by the catalyst with oxygen in the air sent from the oxygen source outlet 132 of the container main body 101 by the pump, thereby generating carbon dioxide.

$$2CO+O_2 \rightarrow 2CO_2 \qquad (10)$$

Then, the mixture gas is supplied from the carbon monoxide remover 194 to a fuel electrode of the fuel battery 195.

The fuel battery 195 includes the electrolytic film, and the water 112 in the water containing pipe 110 is supplied in advance to an electrolyte before the hydrogen gas supplied from the carbon monoxide remover 194 reaches the fuel battery 195. Thus, the ionic conductivity of the electrolytic film can be improved before the power generation, so that the electrolytic film can easily conduct the hydrogen ions produced from the hydrogen gas when the hydrogen gas reaches the fuel battery 195.

In the fuel electrode of the fuel battery 195, the hydrogen gas of the mixture gas supplied from the carbon monoxide remover 194 separates into hydrogen ions and electrons due to a catalytic action of the fuel electrode as shown in Electrochemical Reaction Formula (11). The hydrogen ions are conducted to an air electrode through a solid polymer electrolytic film of the fuel battery 195, and the electrons are extracted by the fuel electrode.

$$3H_2 \rightarrow 6H^+ + 6e^- \qquad (11)$$

The air is sent to the air electrode of the fuel battery 195 from the oxygen source outlet 132 by the pump. Then, as shown in Electrochemical Reaction Formula (12), oxygen in the air, the hydrogen ions passed through the solid polymer electrolytic film and the electrons cause a reaction to produce water as a by-product.

$$6H^+ + \tfrac{3}{2}O_2 + 6e^- \rightarrow 3H_2O \qquad (12)$$

As described above, the electrochemical reactions indicated by (11), (12) are caused in the fuel battery 195 to generate electric energy. A mixture gas of water, carbon dioxide, air and the like as by-products is discharged to the outside.

In the case of FIG. 26B, the power generation unit 191 includes a vaporizer 196 and a fuel battery 197.

The liquid fuel 114 and the water 112 are supplied to the power generation unit 191 by the pump, and mixed. The mixture is vaporized in the vaporizer 196, and becomes a mixture gas of methanol and water vapor. The mixture gas generated in the vaporizer 196 is supplied to a fuel electrode of the fuel battery 197.

In the fuel electrode of the fuel battery 197, the mixture gas supplied from the vaporizer 196 separates into hydrogen ions, electrons and carbon dioxide due to a catalytic action of the fuel electrode as shown in Electrochemical Reaction Formula (13). The hydrogen ions are conducted to an air electrode through a solid polymer electrolytic film, and the electrons are extracted by the fuel electrode.

$$CH_3OH + H_2O \rightarrow CO_2 + 6H^+ + 6e^- \qquad (13)$$

The air sent from the oxygen source outlet 132 of the container main body 101 by the pump is sent to the air electrode of the fuel battery 197. Then, as shown in Electrochemical Reaction Formula (14), oxygen in the air, the hydrogen ions passed through the solid polymer electrolytic film and the electrons extracted by the fuel electrode cause a reaction to produce water.

$$6H^+ + \tfrac{3}{2}O_2 + 6e^- \rightarrow 3H_2O \qquad (14)$$

As described above, the electrochemical reactions indicated by (13), (14) are caused in the fuel battery 197 to generate electric energy. A mixture gas of water, carbon dioxide, air and the like as the by-products is discharged to the outside.

The water 112 contained in the container main body 101 is used during an initial operation in the power generation unit 191. However, when the water 112 contained in the container main body 101 has run out, the water produced in the fuel batteries 195, 197 is supplied to the vaporizers 192, 196.

When the power generation unit 191 is provided in a main body of an electronic device such as a mobile telephone, a notebook-type personal computer, a digital camera, a personal digital assistance (PDA) or an electronic diary, the container main body 101 is detachable from the main body of the electronic device, and the main body of the electronic device operates with electric energy generated by the power generation unit 191. In other words, the electronic device can be applied as the fuel consumption device.

The present invention is not limited to the embodiment described above, and various improvements and design modifications may be made without departing from the spirit of the present invention.

For example, the packing processes of the packing materials 159, 259 are not limited to the processes described above.

EXAMPLE 1

As described above, an amount of a liquid fuel 114 contained can especially be increased if $W1 > (S1/(2 \times \pi))^{1/2}$ is satisfied, wherein S1 is a cross sectional area of a flow path groove 121, 122, and W1 is a width of a flow path groove 121, 122. This will be described using an example of the present invention and a comparative example.

Figure 27A:
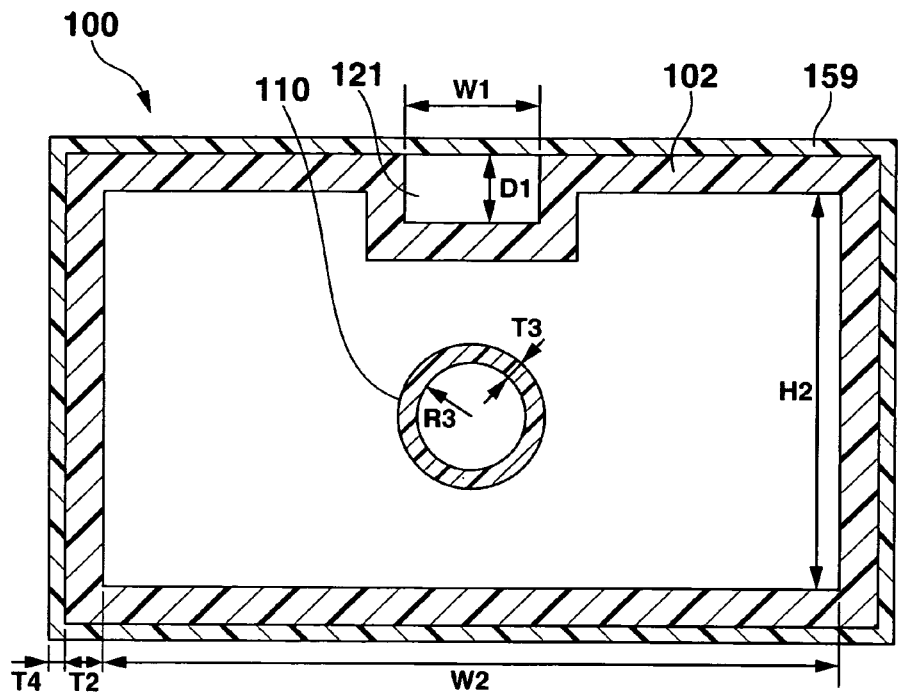
FIGS. 27A and 27B are schematic diagrams to explain an example of the present invention and a comparative example.
Figure 27B:
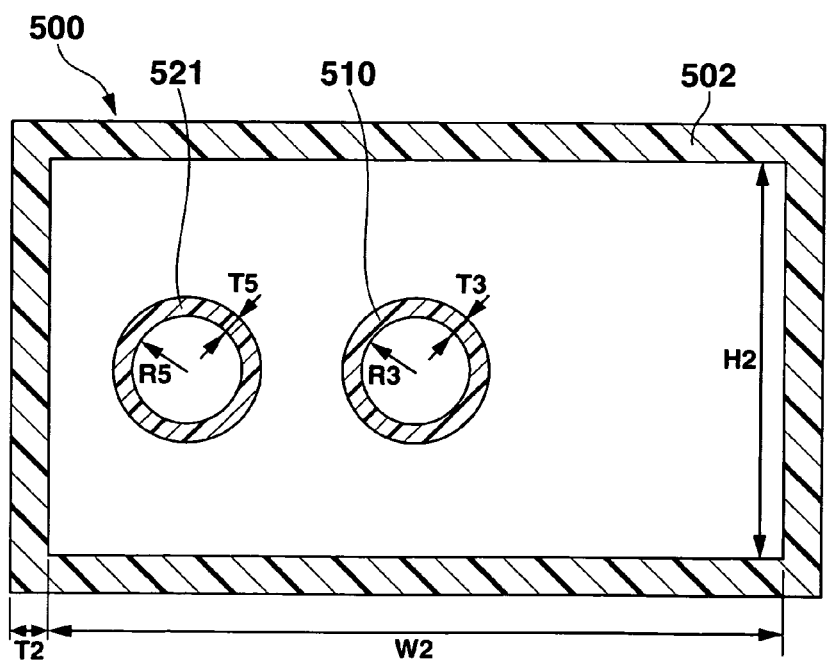

FIG. 27A is a sectional view in which a fuel container 100 to which the present invention is applied is cut along a surface vertical to a longitudinal direction X. FIG. 27B is a sectional view of a fuel container 500 in which the flow path grooves 121, 122 are not formed. It is noted that the flow path groove 122 is not present in FIG. 27A for simplicity of explanation.

In FIG. 27A, T2 is a uniform wall thickness of a hollow portion 102, W2 is an inner width of the hollow portion 102, H2 is a height of the hollow portion 102, R3 is an inside diameter of a water containing pipe 110, T3 is a wall thickness of the water containing pipe 110, W1 is a width of the flow path groove 121, D1 is a depth of the flow path groove 121, and T4 is a thickness of a packing material 159.

A cross sectional area S1 of the flow path groove 121 is expressed by the following equation.

$$S1 = W1 \times D1$$

A cross sectional area S2 of a space containing the liquid fuel 114 is expressed by the following equation.

$$S2 = W2 \times H2 - 2 \times \pi \times (R3+T3)^2 - D1 \times (W1+2 \times T2)$$

An outer cross sectional area S100 of the fuel container 100 is expressed by the following equation.

$$S100 = (W2+2 \times T2+2 \times T4) \times (H2+2 \times T2+2 \times T4)$$

In FIG. 27B, T2 is a uniform wall thickness of a hollow portion 502, W2 is an inner width of the hollow portion 502, H2 is a height of the hollow portion 102, R3 is an inside diameter of the water containing pipe 110, T3 is a wall thickness of the water containing pipe 110, R5 is an inside diameter of an oxygen source pipe 521, and T5 is a wall thickness of the oxygen source pipe 521. Here, the oxygen source pipe 521 is a substitute for the flow path groove 121, and air passes through the oxygen source pipe 521.

An inner cross sectional area Sa5 of the oxygen source pipe 521 is expressed by the following equation.

$$Sa5 = 2 \times \pi \times R5^2$$

An outer cross sectional area Sb5 of the oxygen source pipe 521 is expressed by the following equation.

$$Sb5 = 2 \times \pi \times (R5+T5)^2$$

A cross sectional area S502 of a space containing the liquid fuel 114 is expressed by the following equation.

$$S502 = W2 \times H2 - 2 \times \pi \times (R3+T3)^2 - Sb5$$

An outer cross sectional area S500 of the fuel container 500 is expressed by the following equation.

$$S500 = (W2+2 \times T2) \times (H2+2 \times T2)$$

The wall thickness T2 is sufficiently large with respect to the thickness T4, and if T2>>T4, the cross sectional area S100 of the fuel container 100 is equal to the cross sectional area S500 of the fuel container 500. Thus, if the cross sectional area S2 is larger than the cross sectional area S502, the fuel container 100 can contain more liquid fuel than the fuel container 500. That is, the following condition has only to be satisfied.

$$W2 \times H2 - 2 \times \pi \times (R3+T3)^2 - D1 \times (W1+2 \times T2) > W2 \times H2 - 2 \times \pi \times (R3+T3)^2 - Sb5$$

This equation is organized as follows.

$$Sb5 - D1 \times (W1+2 \times T2) > 0$$

$$2 \times \pi \times (R5+T5)^2 - D1 \times (W1+2 \times T2) > 0 \quad (A)$$

Here, the cross sectional area S1 of the flow path groove 121 is equalized to the inner cross sectional area Sa5 of the oxygen source pipe 521 so that an amount of air flowing in the fuel container 100 is equal to an amount of air flowing in the fuel container 500.

$$Sa5 = 2 \times \pi \times R5^2 = S1 = W1 \times D1$$

Therefore, Equation (A) will be as follows.

$$4 \times \pi \times R5 \times T5 + 2 \times \pi \times T5^2 - 2 \times D1 \times T2 > 0 \quad (B)$$

If the wall thickness T2 of the hollow portions 102, 502 is equal to the wall thickness T5 of the oxygen source pipe 521, Equation (B) will be as follows.

$$2 \times \pi \times T5/W1 \times \{2 \times R5 \times (W1-R5) + T5 \times W1\} > 0 \quad (C)$$

That is, if W1>R5, Equation (C) is always satisfied, and the fuel container 100 can contain more liquid fuel than the fuel container 500.

Because $R5 = \{S1/(2 \times \pi)\}^{1/2}$, $W1 > \{S1/(2 \times \pi)\}^{1/2}$.

What is claimed is:

1. A fuel container comprising:
a main body including a fuel containing section that contains fuel and a water containing section that contains water, the main body having first and second opposite end faces;
a fuel outlet arranged in the first end face of the main body to discharge fuel contained in the fuel containing section;
a water outlet arranged in the first end face of the main body to discharge water contained in the water containing section,
an oxygen source outlet arranged in the first end face to discharge oxygen;
an oxygen source connecting portion which defines a passage for oxygen from an oxygen source exterior of the main body to the oxygen source outlet, and
an oxygen source introduction port arranged in the second end face and through which oxygen is introduced into the oxygen source connecting portion.

2. The fuel container according to claim 1, wherein the fuel containing section has a follower on a tip side of the filled fuel.

3. The fuel container according to claim 1, wherein the water containing section has a water containing pipe disposed in the fuel containing section to contain water therein.

4. The fuel container according to claim 3, wherein the water containing pipe has a follower on a tip side of the filled water.

5. The fuel container according to claim 1, wherein the oxygen source introduction port is provided with a dustproof filter.

6. The fuel container according to claim 1, wherein the oxygen source connecting portion includes an oxygen source pipe arranged in the fuel containing section.

7. The fuel container according to claim 2, wherein the oxygen source introduction port is provided with a dustproof filter.

8. The fuel container according to claim 3, wherein the oxygen source introduction port is provided with a dustproof filter.

9. The fuel container according to claim 4, wherein the oxygen source introduction port is provided with a dustproof filter.

10. The fuel container according to claim 2, wherein the oxygen source connecting portion includes an oxygen source pipe arranged in the fuel containing section.

11. The fuel container according to claim 3, wherein the oxygen source connecting portion includes an oxygen source pipe arranged in the fuel containing section.

12. The fuel container according to claim 4, wherein the oxygen source connecting portion includes an oxygen source pipe arranged in the fuel containing section.

* * * * *